(12) United States Patent
Dash et al.

(10) Patent No.: US 11,258,500 B2
(45) Date of Patent: Feb. 22, 2022

(54) HYBRID SECTOR SELECTION AND BEAMFORMING

(71) Applicant: SEMICONDUCTOR COMPONENTS INDUSTRIES, LLC, Phoenix, AZ (US)

(72) Inventors: Debashis Dash, Newark, CA (US); Hossein Dehghan-Fard, Diablo, CA (US); Reza Hoshyar, San Jose, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 154 days.

(21) Appl. No.: 16/671,049

(22) Filed: Oct. 31, 2019

(65) Prior Publication Data

US 2020/0145072 A1    May 7, 2020

Related U.S. Application Data

(60) Provisional application No. 62/756,049, filed on Nov. 5, 2018.

(51) Int. Cl.
*H04W 4/00*    (2018.01)
*H04B 7/06*    (2006.01)
(Continued)

(52) U.S. Cl.
CPC .......... *H04B 7/0626* (2013.01); *H04B 7/0417* (2013.01); *H04B 7/0456* (2013.01); *H04B 7/0617* (2013.01); *H04B 7/0695* (2013.01)

(58) Field of Classification Search
CPC .. H04B 7/0626; H04B 7/0417; H04B 7/0456; H04B 7/0617
See application file for complete search history.

(56) References Cited

U.S. PATENT DOCUMENTS 8,867,502 B2 *  10/2014  Bharadwaj  ........  H04W 72/0446
                                                   370/336
9,793,965 B1 *  10/2017  Pustovalov  ..........  H04B 7/0452
(Continued)

OTHER PUBLICATIONS

European Patent Application 19207160.3 Examination Report dated Dec. 2, 2020.
(Continued)

*Primary Examiner* — Siren Wei
(74) *Attorney, Agent, or Firm* — Maschoff Brennan

(57) ABSTRACT

An example method may include configuring a pattern of a sounding packet of a first wireless node in a resource space. Configuring the pattern may include assigning first precoders to a first subset of the resource space for a first antenna sector of the first wireless node; and assigning second precoders to a second subset of the resource space for a second antenna sector of the first wireless node. The method may include wirelessly transmitting the sounding packet with the configured pattern to a second wireless node. The method may include transmitting data packets from the first wireless node to the second wireless node according to one or more transmission parameters that are at least one of received from the second wireless node or determined based on channel state information (CSI) feedback received from the second wireless node.

22 Claims, 16 Drawing Sheets

(51) Int. Cl.
    *H04B 7/0417*    (2017.01)
    *H04B 7/0456*    (2017.01)

(56)         References Cited

U.S. PATENT DOCUMENTS

| 10,432,272  | B1* | 10/2019 | Black ..................... H04B 7/024 |
| 2013/0242787 | A1* | 9/2013 | Sun ...................... H04W 24/10 |
|              |     |         | 370/252 |
| 2014/0177746 | A1* | 6/2014 | Hsu ..................... H04B 7/0456 |
|              |     |         | 375/267 |
| 2016/0142115 | A1* | 5/2016 | Onggosanusi ......... H04B 7/065 |
|              |     |         | 370/252 |
| 2016/0329947 | A1  | 11/2016 | Jo et al. |
| 2018/0337716 | A1* | 11/2018 | Fakoorian ............ H04B 7/0404 |
| 2019/0090143 | A1* | 3/2019 | Luo ..................... H04B 7/0617 |

OTHER PUBLICATIONS

Song, et al., "A Scalable and Statistically Robust Beam Alignment Technique for mm-Wave Systems", in IEEE Transactions on Wireless Communications, vol. 17, No. 7, pp. 4792-4805, Jul. 2018.
European Search Report in 19207160.3 dated Feb. 21, 2020.

* cited by examiner

HYBRID SECTOR SELECTION AND BEAMFORMING

CROSS-REFERENCE TO RELATED APPLICATIONS

This patent application claims the benefit of prior filed U.S. Provisional Application No. 62/756,049 filed on Nov. 5, 2018. The 62/756,049 application is incorporated herein by reference.

FIELD

The implementations discussed herein are related to hybrid sector selection and beamforming.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a communication channel(s) for the associated local network, access to the shared communication channel(s) relies on a multiple access methodology identified as Collision Sense Multiple Access (CSMA). CSMA is a distributed random access methodology for sharing a single communication medium, by having a contending communication link back off and retry access if a prospective collision on the wireless medium is detected, i.e. if the wireless medium is in use.

In some related art approaches, packet detection and decoding requires the best antenna and receive (RX) beamforming (BF) pattern selection to use for optimal performance in the presence of directional sectorized antennas.

The subject matter described herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to hybrid sector selection and beamforming.

An example method may include configuring a pattern of a sounding packet of a first wireless node in a resource space. Configuring the pattern may include assigning first precoders to a first subset of the resource space for a first antenna sector of the first wireless node. The first wireless node has multiple antenna sectors that include the first antenna sector and a second antenna sector. Configuring the pattern may include assigning second precoders to a second subset of the resource space for the second antenna sector of the first wireless node. The method may include wirelessly transmitting the sounding packet with the configured pattern to a second wireless node. The method may include transmitting data packets from the first wireless node to the second wireless node according to one or more transmission parameters that are at least one of received from the second wireless node or determined based on channel state information (CSI) feedback received from the second wireless node. The one or more transmission parameters may include at least one of transmit antenna state and a beamforming matrix to send data packets from the first wireless node to the second wireless node. The transmit antenna state may specify at least one of a specific antenna sector of the antenna sectors and a specific polarization of one or more of the antenna sectors to send data packets. The beamforming matrix may specify at least one of discrete phase adjustments and discrete amplitude adjustments to send data packets.

Example implementations can include single carrier resources spaces or orthogonal frequency division multiplexing (OFDM) time-frequency resource spaces. For example, the single carrier resource space can include the first subset and second subset of the resource space based on a predetermined subset, frequency hopping, time domain, or code domain.

An example method may include configuring a pattern of a sounding packet of a first wireless node in an orthogonal frequency division multiplexing (OFDM) time-frequency resource space. Configuring the pattern may include assigning first precoders to a first subset of active tones in the OFDM time-frequency resource space for a first antenna sector of the first wireless node. The first wireless node has multiple antenna sectors that include the first antenna sector and a second antenna sector. Configuring the pattern may include assigning second precoders to a second subset of active tones in the OFDM time-frequency resource space for the second antenna sector of the first wireless node. The method may include wirelessly transmitting the sounding packet with the configured pattern to a second wireless node. The method may include transmitting data packets from the first wireless node to the second wireless node according to one or more transmission parameters that are at least one of received from the second wireless node or determined based on channel state information (CSI) feedback received from the second wireless node. The one or more transmission parameters may include at least one of transmit antenna state and a beamforming matrix to send data packets from the first wireless node to the second wireless node. The transmit antenna state may specify at least one of a specific antenna sector of the antenna sectors and a specific polarization of one or more of the antenna sectors to send data packets. The beamforming matrix may specify at least one of discrete phase adjustments and discrete amplitude adjustments to send data packets.

Another example method may include receiving a sounding packet from a first wireless node at a second wireless node. The sounding packet may include first precoders on a first subset of active tones in an OFDM time-frequency resource space. The first precoders on the first subset of active tones may be received at the second wireless node from a first antenna sector of multiple antenna sectors of the first wireless node. The sounding packet may include second precoders on a second subset of active tones in the OFDM time-frequency resource space. The second precoders on the second subset of active tones may be received at the second wireless node from a second antenna sector of the antenna sectors of the first wireless node. The method may include processing the sounding packet to generate at least one of CSI and one or more transmission parameters, the one or more transmission parameters including at least one of transmit antenna state and a beamforming matrix. The method may include sending to the first wireless node at least one of the one or more transmission parameters and CSI feedback that includes or is derived from the CSI.

The invention may be implemented in hardware, firmware, or software. Associated devices and circuits are also claimed. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only typical implementations of the invention and are therefore not to be considered limiting of its scope. The invention will be described and explained with additional specificity and detail using the accompanying drawings in which.

DETAILED DESCRIPTION OF SOME EXAMPLE IMPLEMENTATIONS

Directional sectorized antennas may include multiple antenna sectors. Each antenna sector may be capable of transmitting and receiving in any of multiple directions with any of multiple phases. It may be complicated and/or resource-intensive with such antennas to determine the channel between a link pair. For example, a complete determination of the channel may involve multiple channel uses, e.g., multiple sounding packets, including one sounding packet per sector and/or per direction in each sector, etc.

Implementations described herein, however, may improve efficiency with precoded sounding packets that sound the channel between the link pair that has N antenna sectors and/or directions in, e.g., a single channel use or more generally in fewer than N channel uses. In some implementations, fewer than N channel uses can be used with the historical information to reduce the N channel usages. Example aspects of the present disclosure improve performance, throughput, coverage, CSI based motion detection to obtain the channel estimate with less overhead. Accordingly, implementations described herein may reduce overhead and shorten sounding compared to traditional approaches involving sounding of directional sectorized antennas. Some implementations may do a per chain precoding or common precoding. For example, in a larger space with multiple users, a per chain precoding can be used with improved resolution for TX parameters for multi-user frames to provide improved performance. In another example, in stationary or predictable environments a common precoding can be used with sampling over time that utilizes less hardware resources. Thus, common precoding enables power savings and reduces manufacturing costs.

Reference will now be made to the drawings to describe various aspects of example implementations of the invention. It is to be understood that the drawings are diagrammatic and schematic representations of such example implementations, and are not limiting of the present invention, nor are they necessarily drawn to scale.

Figure 1A:
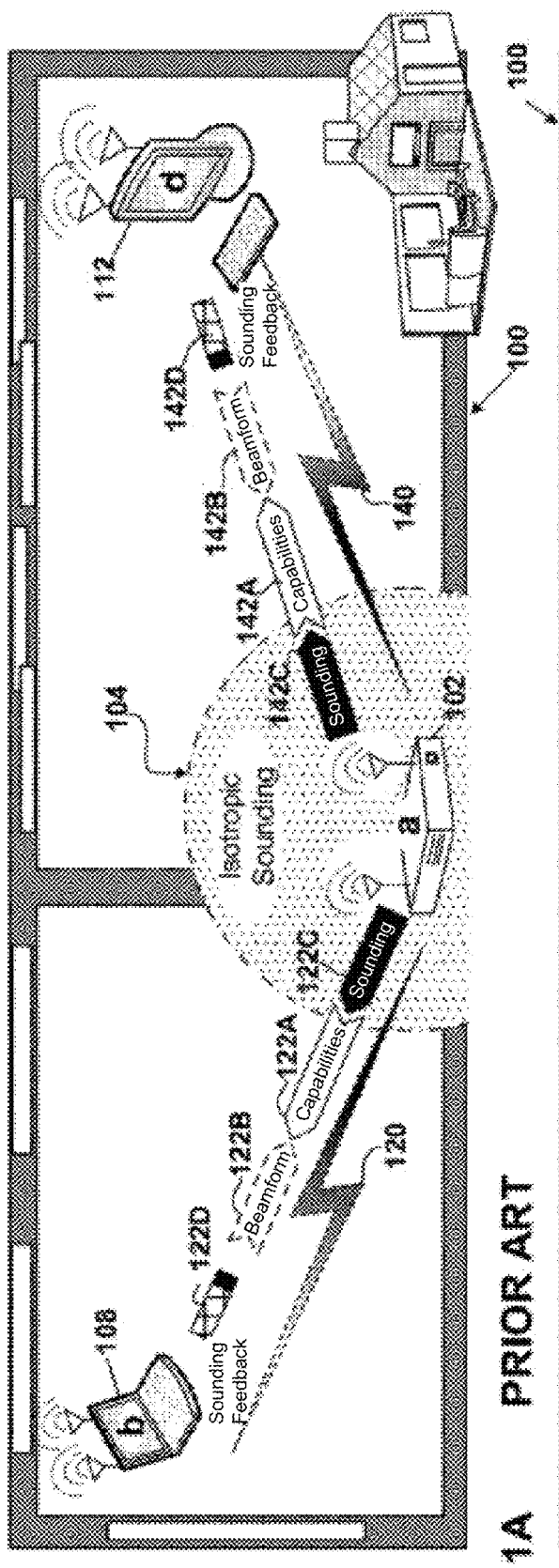
FIGS. 1A-B are plan views of Prior Art WLAN intermittent channel soundings and beamformed communications respectively.
Figure 1B:
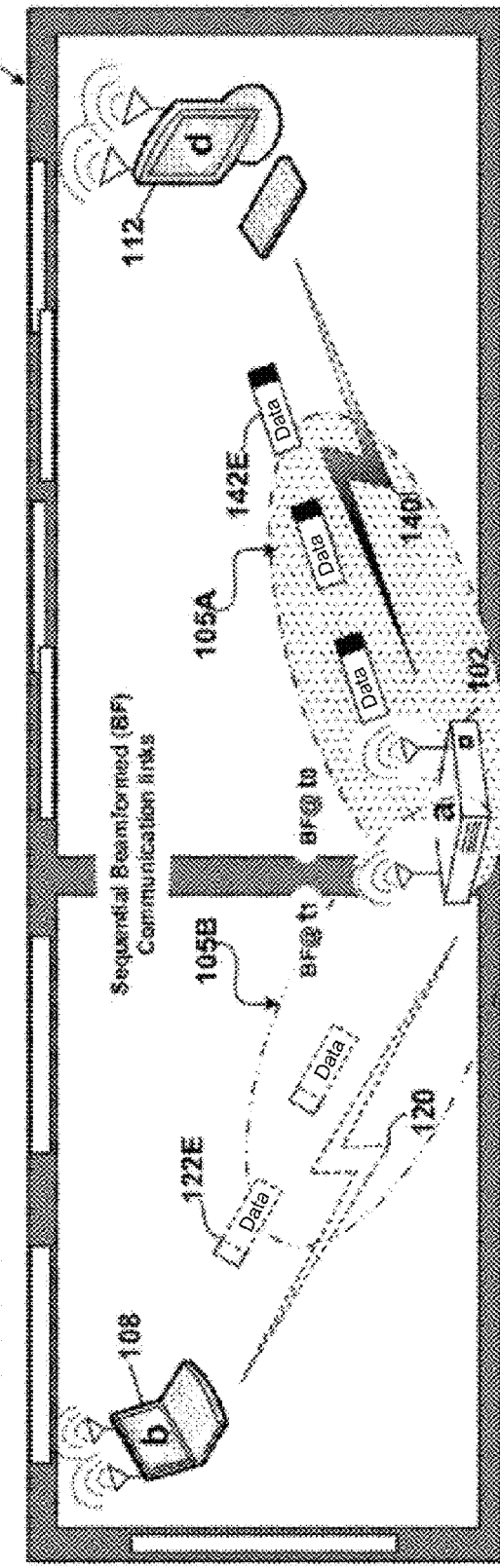

FIGS. 1A-B are plan views of Prior Art WLAN intermittent channel soundings and beamformed communications respectively. FIGS. 1A and 1B specifically illustrate a residence 100 that includes a wireless access point (WAP) 102 and wireless stations 108 and 112. FIG. 1A illustrates channel soundings which are intermittent probes sent from the WAP 102 identifying one or more of the wireless stations 108, 112 from which sounding feedback is requested. The response to the probes from the recipient wireless stations 108, 112 contains information which allows the WAP 102 to quantify the characteristics of the channel between it and the wireless station 108, 112. The WAP 102 uses this information to improve the efficiency of subsequent communications of data to the intended recipient. The soundings themselves may be sent from the WAP 102 to one or more wireless stations 108, 112 or from one of the wireless stations 108, 112 to the WAP 102. The soundings, whether sent from a device with a single antenna or multiple antennas, generally exhibit an isotropic radiation footprint, i.e. of equal radio frequency (RF) signal strength in all directions. Soundings generally exhibit isotropic RF signal strengths because: a) they are intended to be received by all devices and b) they are designed to allow the recipient device to identify the link channel characteristics. The sounding itself includes a preamble field with known modulation, number of streams, and bit sequence which the recipient device analyzes upon receipt to determine changes thereto brought about the link channel, e.g. fading, attenuation, and phase shift.

In FIG. 1A the WAP 102 is shown setting up communication links 120 and 140 with, respectively, wireless stations 108 and 112 within the residence 100. Each link pair exchanges capabilities, e.g., capabilities 122A and 122B on link 120 and capabilities 142A and 142B on link 140. During this exchange the number of antenna, the number of streams, and/or the coding and beamforming support capabilities of each device are exchanged. Next, an initial explicit sounding request and response takes place as sounding packet 122C and sounding feedback 122D on link 120 and as sounding packet 142C and sounding feedback 142D on link 140. Each sounding packet 122C, 142C is sent using an isotropic RF signal strength 104. The sounding 122C, 142C itself identifies the target station(s) from which a response is requested, and includes a preamble field which is modulated at the maximum number of streams supported by the link partners using a bit sequence and modulation and coding scheme (MCS) known to all recipients. Upon receipt the recipient station(s) (e.g., wireless stations 108, 112 in this example) determines changes in amplitude and phase to the sounding 122C, 142C brought about by the link channel via, e.g., fading, attenuation, and phase shift, and passes indicia of these channel characteristics as sounding feedback response packets 122D, 142D back to the WAP 102 where they are immediately used to set up beamforming of subsequent data communications as shown in FIG. 1B.

The IEEE 802.11n and above standards support increasing degrees of complexity in the signal processing required of fully compliant WLAN nodes including beamforming capability for focused communication of user data. One of the many capabilities of a fully compliant WLAN node under either of these standards is the ability to focus the signal strength of a transmitted communication toward a receiving device. Doing so requires multiple antenna and means for independently controlling the phase and amplitudes of the communication signals transmitted thereon. A baseband (BB) component of the WAP or station called a spatial mapper takes as input the independent communication streams for each antenna together with a steering matrix, a.k.a. beamforming matrix, determined during a prior isotropic sounding of the channel as shown in FIG. 1A. The steering matrix contains complex coefficients corresponding to the discrete phase and amplitude adjustments to each antenna's communication streams which provide the required focused signal strength to the composite of the signals transmitted from all antennas. Ideally the superposition of the beamforming matrix coefficients on the corresponding transmitted communication signals from each antenna will result in constructive interference of the communication signals with one another along the path to the target and destructive interference elsewhere. The greater the number of antenna in the phased array the more focused the resultant signal strength.

The steering matrix is derived from the prior sounding and the sounding itself is made using an isotropic radiation profile as shown in FIG. 1A. This isotropic radiation profile can be achieved either by relying on the inherent isotropy of the antennas in a MIMO array and without any steering matrix or by using a steering matrix designed to produce isotropic signal strength in the sounding.

In FIG. 1B the WAP 102 is shown using the sounding feedback 122D, 142D to set up subsequent data communications with its link partners, e.g., wireless stations 108, 112. Where the capabilities of the link partners permit, the sounding feedback 122D, 142D is used to establish subsequent beamformed data communications. Beamforming increases the received signal strength and is achieved by independent changes in phase and or amplitude of the signal transmitted from each of the transmit antennas which collectively steer the transmit power footprint toward the intended recipient station(s), using the CSI obtained in the sounding feedback 122D, 142D (See FIG. 1A). After each link's beamsteering matrix is determined, the sounding feedback is discarded. The WAP 102 is shown in FIG. 1B at time $t_0$ using its multiple antenna to beamform 105A downlink data communication packets 142E on the link 140 to the wireless station 112. Subsequently at time $t_1$, the WAP 102 is shown in FIG. 1B beamforming 105B downlink data communication packets 122E on the link 120 to the wireless station 108. As data communications degrade either or both link partners re-sound the link to update the link CSI, and the prior beamsteering information is discarded.

Directional sectorized antennas may include multiple antenna sectors. Each antenna sector may be capable of transmitting and receiving in any of multiple directions with any of multiple phases. It may be complicated and/or resource-intensive with such antennas to determine the channel between a link pair. For example, a complete determination of the channel may involve multiple channel uses, e.g., multiple sounding packets, including one sounding packet per sector and/or per direction in each sector. Implementations described herein, however, may improve efficiency with precoded sounding packets that sound the channel between the link pair that has N antenna sectors and/or directions in, e.g., a single channel use or more generally in fewer than N channel uses.

Figure 2:
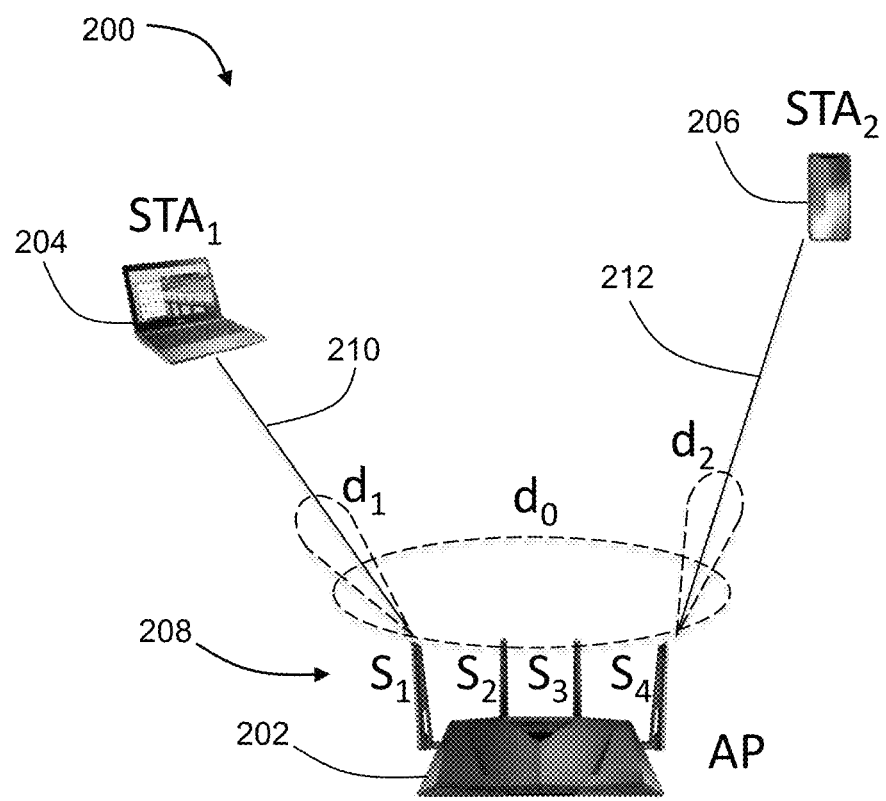
FIG. 2 illustrates an example operating environment that may implement hybrid sector selection and beamforming.

FIG. 2 illustrates an example operating environment 200 that may implement hybrid sector selection and beamforming, arranged in accordance with at least one implementation described herein. The environment 200 includes multiple wireless nodes, including an access point (AP) 202, a first wireless station (STA) 204, and a second STA 206. More generally, the environment may include two or more wireless nodes, where any two of the wireless nodes may form a link pair and implement hybrid sector selection and beamforming as described herein. Each wireless node may include an AP, a gateway, a repeater, a mesh node, a STA, or other suitable wireless node.

The AP 202 may include a directional sectorized antenna 208 that may include multiple antenna sectors $S_1$-$S_4$ of phase arrays. Each of the STAs 204, 206 may similarly include a corresponding directional sectorized antenna with multiple sectors of phase arrays (not shown in FIG. 2).

The AP 202 may include an antenna control circuit to control the antenna 208 for communicating with the STAs 204, 206. An example antenna control circuit is described in more detail herein. As described herein, the AP 202 may use precoded and/or compressed sounding and feedback to do antenna/sector/beam/polarization selection and dynamic RF/BB beamforming. An example hybrid sector and beamforming selection process includes pre-coded and compressed sounding and metric based dynamic selection and hybrid beamforming. Example aspects of the present disclosure may employ a max throughput eigen direction metric, a max coverage monitoring metric, or other suitable metric(s) to determine one or more transmission parameters based on the sounding. The one or more transmission parameters may include transmit antenna state (e.g., antenna, sector, beam, polarization, etc.), RF/BB beamforming matrix, or other suitable transmission parameters.

FIG. 2 additionally illustrates a communication link 210 that may be established between the AP 202 and the first STA 204 and a communication link 212 that may be established between the AP 202 and the second STA 206. FIG. 2 further illustrates an example isotropic radiation profile do of the antenna 208, e.g., when transmitting sounding packets, as well as example directional radiation profile $d_1$ and $d_2$ for the communication links 210, 212 that may be implemented to transmit data packets to the STAs 204, 206 according to transmission parameters determined from the sounding. Implementations described herein can include single carrier resources spaces or orthogonal frequency division multiplexing (OFDM) time-frequency resource spaces. Some implementations may distribute each sounding packet across various time slots and/or subcarriers (i.e., tones) within a OFDM time frequency resource units or time-frequency resource space to e.g., allow multiple antenna sectors to be tested by a single sounding packet in a single channel use.

Figure 3:
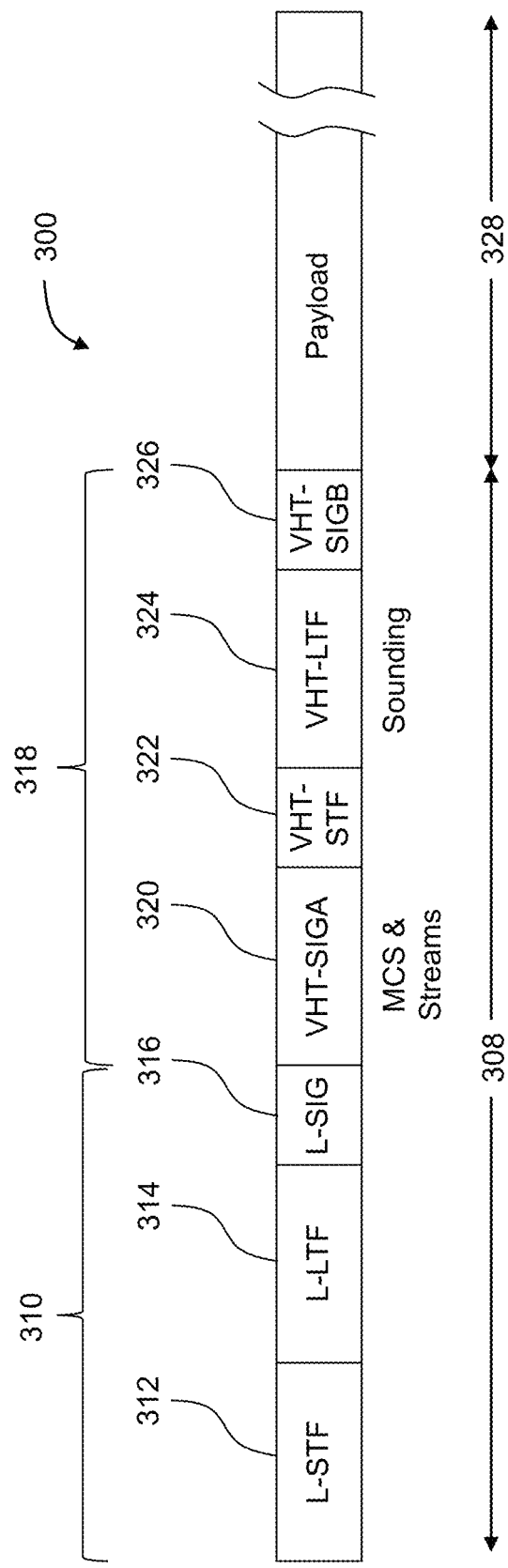
FIG. 3 is a packet diagram of an example wireless user data packet.

FIG. 3 is a packet diagram of an example wireless user data packet 300 (hereinafter packet 300), arranged in accordance with at least one implementation described herein. In the example of FIG. 3, the packet 300 may specifically include, in the IEEE 802.11 parlance, a Physical Layer Convergence Protocol (PLCP) Protocol Data Unit (PPDU). The packet 300 may include one or more WLAN packet headers that may include various preamble fields with known sequences which allow a receiver node to synchronize reception with packet boundaries and to determine the received channel. One such header is designated at 308 in FIG. 3, hereinafter header 308.

The header 308 includes a legacy portion 310 containing a legacy-short training field (L-STF) 312, a legacy-long training field (L-LTF) 314, and a legacy-signal (L-SIG) field 316. The header 308 also contains a very high throughput (VHT) portion 318 containing a VHT-signal A (VHT-SIGA) field 320, a VHT-short training field (VHT-STF) 322, a VHT-long training field (VHT-LTF) 324, and a VHT-signal B (VHT-SIG-B) field 326. The L-LTF field 314, the L-STF field 312, and the L-SIG field 316 are compatible with stations that support only the IEEE 802.11n or earlier standards. The remaining signal and training fields, e.g., in the VHT portion 318, are intended only for very high throughput, e.g. IEEE 802.11ac/ax compliant devices. The VHT-SIGA field 320 may contain information on the MCS and number of streams of the sounding. The VHT-STF field 322 may be used for automatic gain control (AGC). The VHT-LTF field 324, a.k.a. channel estimation or sounding field, may contain a long training sequence used for MIMO channel estimation by the receiver node.

The packet 300 additionally includes a payload 328. The payload 328 of the packet 300 contains uplink or downlink user data. The explicit sounding provided for in the IEEE 802.11ac or above standards allows the receiver to assist the transmitter to steer subsequent user data communications toward the receiver using the beamforming matrix or other transmission parameters determined (e.g., by the receiver or the transmitter) in response to the explicit link channel sounding initiated by the transmitter. An explicit sounding may be initiated by an AP or a STA or other wireless node. In an example, an AP initiates a sounding by sending at time $t_0$ a null data packet announcement (NDPA) frame. The NDPA identifies the AP and the target recipient station(s) for the sounding. Where more than one station is a target recipient, the order in which the recipient stations are listed controls the order of their response.

Next at time $t_1$ (subsequent to time $t_0$) a null data packet (NDP) is sent by the AP. The NDP contains no user data, rather the header of the packet contains a ubiquitous preamble field, which in the case of the IEEE 802.11ac standard is identified as the VHT-LTF field 324 shown in FIG. 3. The VHT-LTF field a.k.a. channel estimation or sounding field, contains a long training sequence used for MIMO channel estimation by the receiver. Each recipient device then determines one or more corresponding transmission parameters (e.g., antenna state, beamsteering matrix, etc.) to adjust the phase and amplitude of subsequent MIMO transmissions by the AP so as to maximize the received signal strength or other metric (e.g., CSI coverage, etc.) at the receiving station.

The first target station then responds at time $t_2$ (subsequent to time $t_1$) with the one or more transmission parameters determined by the first target station or with CSI feedback from which the transmitter may determine the one or more transmission parameters. The one or more transmission parameters and/or CSI feedback are specific to the link or channel between the AP and the first target station. If the first target station is IEEE 802.11n-compliant, the one or more transmission parameters may be in the form of the link channel matrix H. If the first target station is IEEE 802.11ac-compliant, the one or more transmission parameters may be in the form of the actual unitary beamsteering matrix V and the per tone diagonal matrix signal to noise ratio (SNR).

Any remaining stations targeted by the initial sounding may respond with one or more transmission parameters and/or CSI feedback for the corresponding link or channel with the AP when asked to do so by the AP. In some implementations, for instance, the AP may send a report poll packet at time $t_3$ (subsequent to time $t_2$) identifying the next target station from which sounding feedback is requested. That station then responds at time $t_4$ (subsequent to time $t_3$) with the one or more transmission parameters and/or CSI feedback. After all target stations have responded, at time is (subsequent to time $t_4$), j the communication of user data packets resumes and user data is sent on the link(s) that have been sounded using the associated transmission parameters determined during the preceding sounding.

Sounding is generally made possible by the fact that all packets transmitted over a WLAN include the VHT-LTF field 324. The VHT-LTF field 324, also known as the sounding field, contains known or pre-configured: modulation, number of streams, and bit sequence which a recipient device analyzes upon receipt to determine changes thereto brought about the link channel, e.g. fading, attenuation, and phase shift. What makes a sounding packet a sounding packet is not the sounding field or VHT-LTF field 324 in the header 308, but rather the NDPA payload instructions which identify the target station(s) which is(are) requested to share a corresponding channel analysis or feedback with the transmitter so as to improve subsequent communications from the transmitter.

Figure 4A:
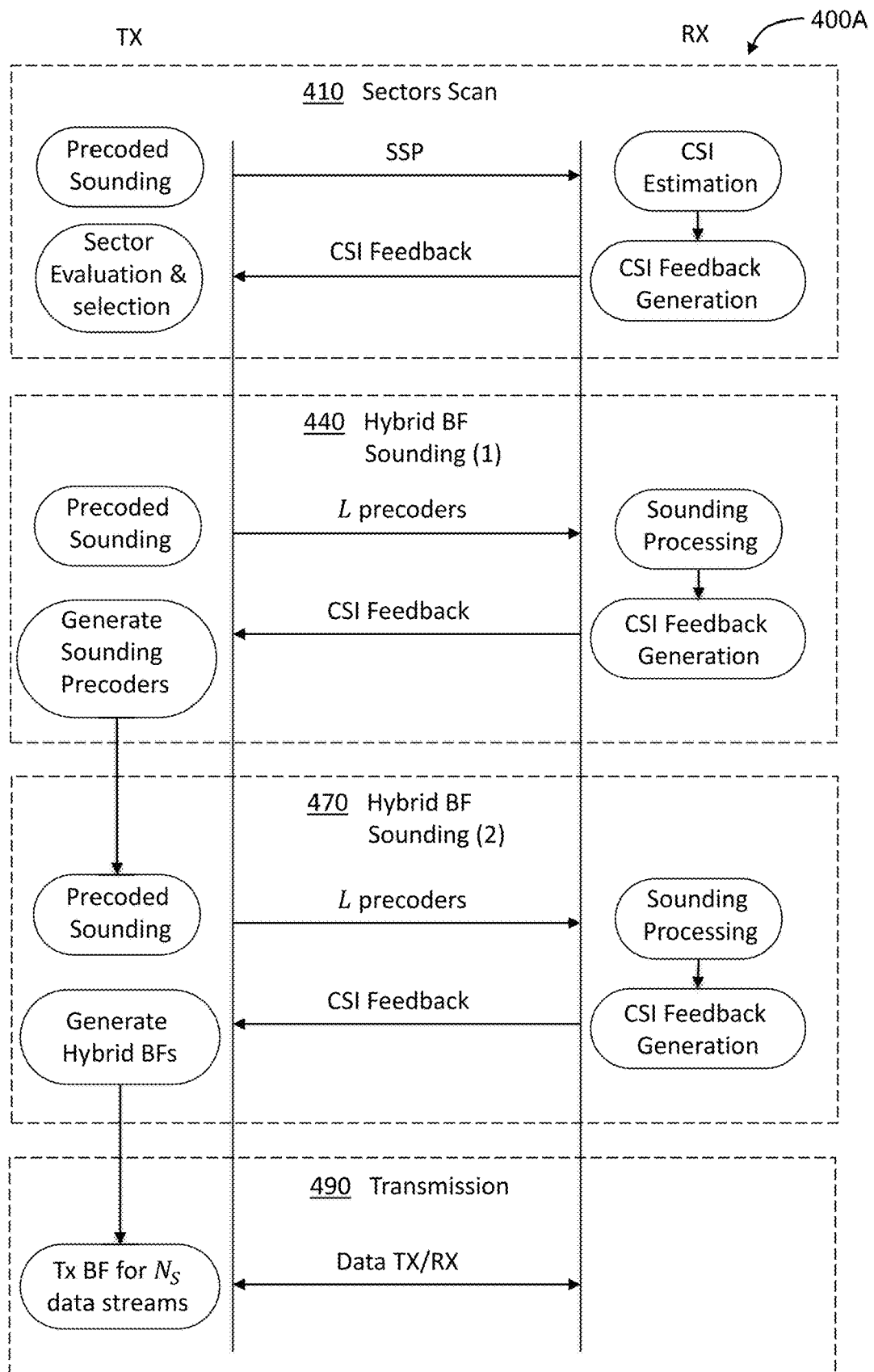
FIG. 4A illustrates example process flows for hybrid sector and beamforming selection.

FIG. 4A illustrates example process flows 400A for hybrid sector and beamforming selection, arranged in accordance with at least one implementation described herein. The process flows 400A includes process flows 410, 440, 470, and 490 any of which may be implemented alone or in any combination. Various implementations can employ combinations of sector sounding 410 and a variety of hybrid beamforming sounding processes 440, 470 to transmit beamforming for sector data streams. In FIG. 4A, two headings, TX and RX, respectively designate a transmitter wireless node and a receiver wireless node, which may respectively correspond to the AP 202 and the first STA 204 (or the second STA 206) of FIG. 2.

Process flow 410 illustrates an example sectors scan to sound using precoded sounding where the transmitter wireless node sends a sectors sounding packet (SSP). SSP precoding may be different from the precoding used for hybrid BF sounding (see, e.g., process flows 440, 470). Hybrid BF may be fixed to a typical setting, chosen based on history of the RX wireless node, and/or associated with an arbitrary setting if no information is available. In an example implementation, multiple hybrid BF precoders can be used across tones in the OFDM time-frequency resource space. A full set of sectors or a subset of sectors may be sounded one by one (e.g., 1 or multiple LTF per sounded sector), or in a same sounding frame according to embodiments described herein.

In an example, SSP is used for sharing baseband and RF precoding blocks with all antennas and sectors. The SSP can be set in a round-robin scheduling (or any generalized scanning mechanism as understood by one of ordinary skill in the art) to receive sounding feedback that is used to determine the channel estimates. For example, round-robin scheduling can be used to determine channel estimates for each available antenna, each available sector, a subset of available antennas, a subset of available sectors, etc. The subset of available antennas or sectors can be based on the RX capabilities of a second wireless station that a sounding is directed to. In another example, the subset of available antennas or sectors can be based on historical channel estimates from a second wireless station the sounding is directed to. In an example implementation, the SSP is received at the RX wireless node and CSI may be estimated by the RX wireless node from the SSP. The RX wireless node may then generate CSI feedback and send it to the TX wireless node.

The TX wireless node may receive the CSI feedback and, in the sector evaluation and selection block, may calculate a metric for each sector or antenna state configuration to determine a particular one of multiple antenna sectors of the TX wireless node to use moving forward for the communication link with the RX wireless node. This may include performing interpolation, if applicable, in some implementations. In some implementations, the antenna sector selected at the sector evaluation and selection block may include the antenna sector that optimizes the metric. The metric may include receive signal strength indicator (RSSI) (e.g., coming from the AGC stage), interference, MIMO channel state information (coming from baseband), or other suitable metric.

Process flows 440 and 470 include hybrid BF sounding processes that may employ precoded sounding with CSI feedback to generate hybrid beamforming. In hybrid BF sounding pre-coding (e.g., in the precoded sounding block): multiple precoders may be used across tones over the selected sector; a BB precoder may be any complex matrix deemed appropriate; an RF precoder may include any phase shift combination and possibly other RF functionalities allowed by RF circuit.

In another example, a current precoding matrix is determined from the subset of the sampling space determined from the historical space. The information acquired from the feedback of the first sounding can be used to narrow down the space used to sample in the second sounding. The dimensionality of the sampling subspace can be reduced from the historical information and/or iterative sounding feedback. For example, an AP with 8 antennas can perform a first sounding with full dimensionality utilizing the 8 dimensions, receive feedback, and determine a reduced dimension subspace with fewer than 8 dimensions. The subsequent soundings excite reduced dimension subspace(s) determined in the previous sounding.

For more than one hybrid BF sounding process flow 440, 470, the precoders used in a subsequent process flow (e.g., at the precoded sounding block in the process flow 470) may be chosen depending on one or more previous rounds of sounding. In the generate hybrid BFs block of the process flow 470, after reception of the CSI feedback of all the soundings, the final settings for BB and RF beamformers and/or other transmission parameters may be calculated and applied.

Process flow 490 includes a transmission process that may include transmitting data packets from the transmit wireless node to the receive wireless node using and/or according to the one or more transmission parameters.

In some example implementations, the processes 400A of FIG. 4A may be implemented with different, fewer, or more blocks. The processes 400A may be implemented as processing logic of a circuit and/or in computer executable instructions, which can be stored on a medium, loaded onto one or more processors of one or more computing devices, and executed as a computer-implemented method. In an example implementation, the sectors scan 410 can be used with the transmission process 490. In another example implementation, the sectors scan 410 can be used with hybrid BF sounding 440 and transmission process 490. In another example implementation, sectors scan 410 can be used with hybrid BF sounding 440, hybrid BF sounding process 470, and transmission process 490.

A similar process can be followed to utilize the symmetry of the forward and reverse channels to use the same sounding to derive decision parameters for the second node implicitly. In an implementation, information determined and/or derived at the receiver node according to this and/or other methods described herein may be used to derive transmission parameters from the receiver node to the sender node. For example, channel is generally reciprocal; that is, the channel from the sender node to the receiver node (hereinafter the "sender-to-receiver channel") may generally be reciprocal to the channel from the receiver node to the sender node (hereinafter the "receiver-to-sender channel"). Accordingly, CSI and/or other information about the sender-to-receiver channel that is determined and/or derived at the receiver node according to the methods described herein may be used to derive transmission parameters for the receiver-to-sender channel. For example, the receiver node may configure beamforming, antenna state, and/or other transmission parameters to send data to the sender node over the receiver-to-sender channel according to the CSI and/or other information determined and/or derived at the receiver node for the sender-to-receiver channel. In cases where the CSI and/or other information for the sender-to-receiver channel is not valid for the receiver-to-sender channel, the receiver-to-sender channel may be calibrated and/or account for separate from the sender-to-receiver channel. In an example, the precoding matrices are shared with the receiver side.

Figure 4B:
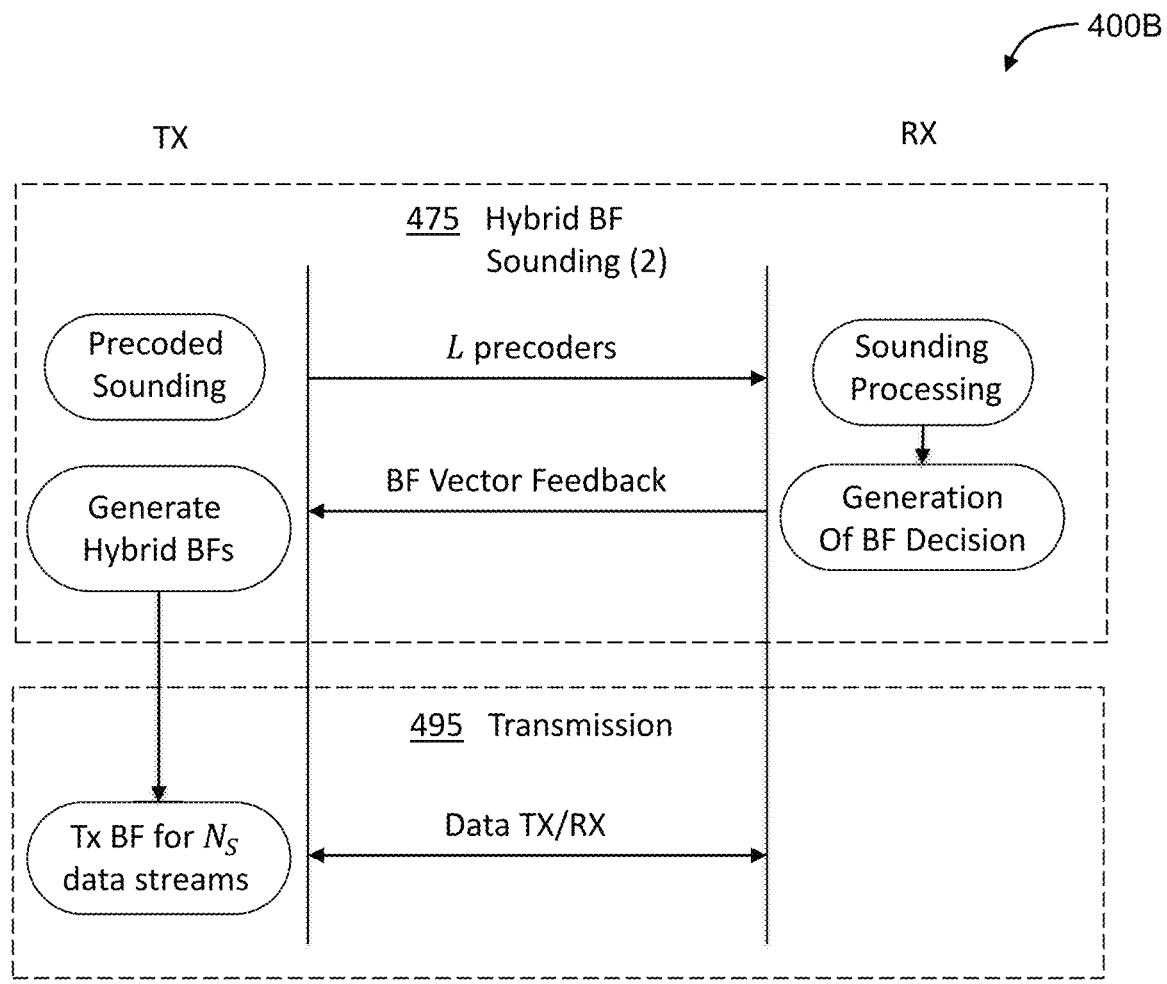
FIG. 4B illustrates other example process flows for hybrid sector and beamforming selection.

FIG. 4B illustrates other example process flows 400B for hybrid sector and beamforming selection, arranged in accordance with at least one implementation described herein. The process flows 400B includes process flows 475 and 495 any of which may be implemented alone or in any combination. One or more of the process flows 400B may be similar to one or more of the process flows 400A of FIG. 4A and may be incorporated and/or combined with one or more of the process flows 400A of FIG. 4A. In FIG. 4A, two headings, TX and RX, respectively designate a transmitter wireless node and a receiver wireless node, which may respectively correspond to the AP 202 and the first STA 204 (or the second STA 206) of FIG. 2.

In the example implementation of FIG. 4B, the hybrid BF sounding 275 can include precoded sounding which may be the same as or similar to precoded sounding in one or more of the process flows 400A of FIG. 4A. Precoded sounding in this and other implementations may include generating a sounding packet that includes L precoders for sounding processing. The receiver wireless node can generate the BF decision and return BF vector feedback for the generation of hybrid BFs at the transmitter wireless node and integrate with transmissions 295. In this example, the receiver wireless node may translate the precoded sounding signal to form the beamforming pattern. The receiver wireless node may generate a compressed beamforming matrix or indexed version of the decision and may send it back to the transmitter wireless node. The receiver wireless node may also request more sounding based on the accuracy and reliability of the current metric.

Figure 5A:
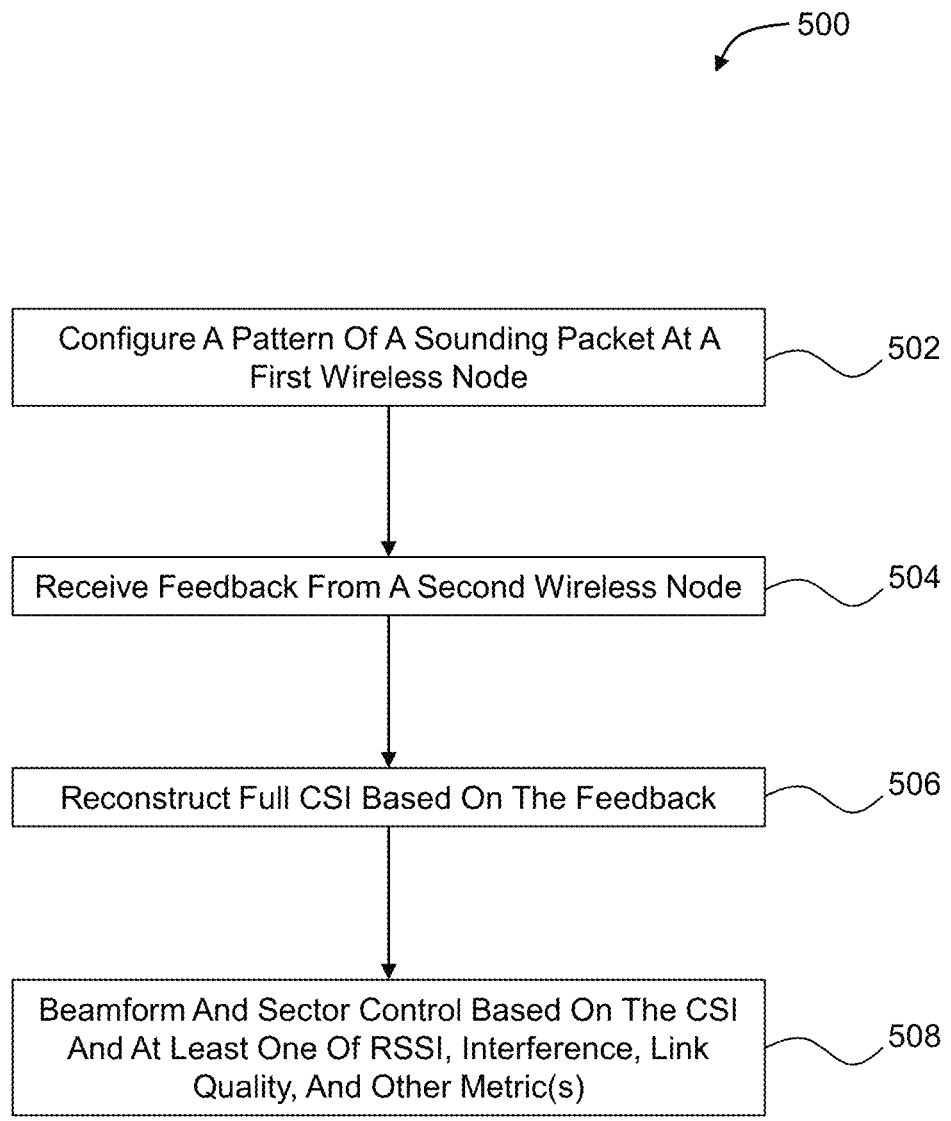
FIG. 5A is a flow diagram of an example method for sounding with hybrid sector and beamforming selection.

FIG. 5A is a flow diagram of an example method 500 for sounding with hybrid sector and beamforming selection, arranged in accordance with at least one implementation described herein. The method 500 may be performed by processing logic that may comprise hardware (circuitry, dedicated logic, etc.), software (such as operates on a computer system or a dedicated machine), or a combination of both. An antenna control circuit of, e.g., the AP 202 of FIG. 2, may perform or control performance of the method 500 of FIG. 5A. Alternatively, other processing logic or hardware may perform or control performance of the method 500 of FIG. 5A.

At block 502, a first wireless node configures a pattern of a sounding frame. The first wireless node may include the AP 202 of FIG. 2 or one of the STAs 204, 206 of FIG. 2 or other wireless node. The sounding frame may be sent to one or more other wireless nodes that include a second wireless node. The second wireless node may include one of the STAs 204, 206 of FIG. 2 or the AP 202 of FIG. 2 or other wireless node. At block 504, the first wireless node receives feedback from the second wireless node, such as CSI feedback. At block 506, the first wireless node reconstructs full CSI of the channel between the first and second wireless nodes. At block 508, the first wireless node determines one or more transmission parameters, such as beamforming (e.g., a beamforming matrix) and sector control (e.g., a specific antenna sector of multiple antenna sectors for transmission), based on the reconstructed CSI and at least one of RSSI, Interference, link quality, and other metric(s).

Figure 5B:
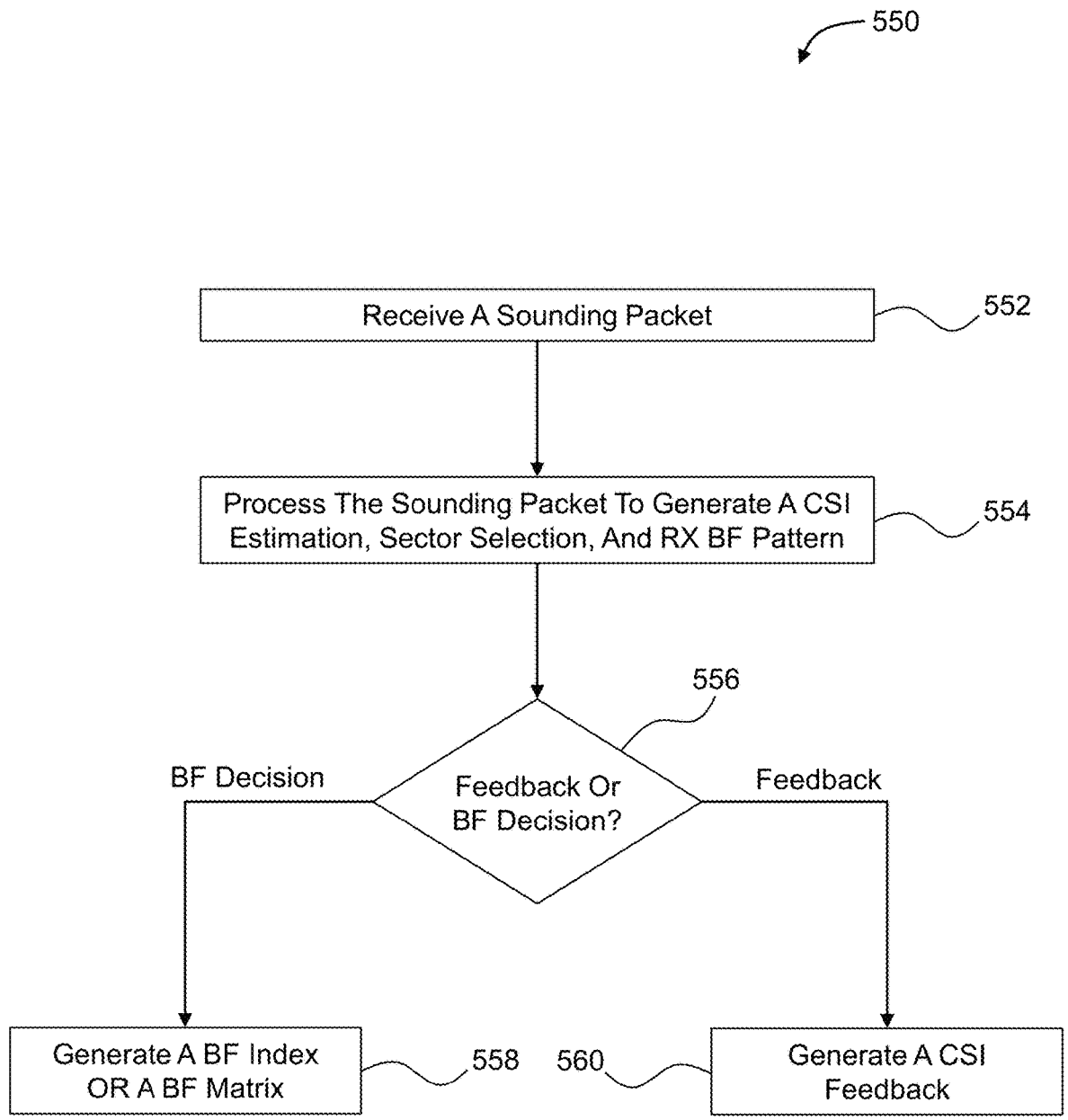
FIG. 5B is a flow diagram of another example method for sounding with hybrid sector and beamforming selection.

FIG. 5B is a flow diagram of another example method 550 for sounding with hybrid sector and beamforming selection, arranged in accordance with at least one implementation described herein. The method 550 may be performed by processing logic that may comprise hardware, software, or a combination of both. A processor device of, e.g., one of the STAs 204, 206 of FIG. 2, may perform or control performance of the method 550 of FIG. 5B. Alternatively, other processing logic or hardware may perform or control performance of the method 550 of FIG. 5B.

At block 552, a sounding packet from a first wireless node is received at a second wireless node. The first wireless node may include the AP 202 of FIG. 2 or one of the STAs 204, 206 of FIG. 2 or other wireless node. The second wireless node may include one of the STAs 204, 206 of FIG. 2 or the AP 202 of FIG. 2 or other wireless node. At block 554, the second wireless node processes the sounding packet to generate a CSI estimation, sector selection and RX BF pattern. For example, based on all the packets received, the receiver can use either implicit or explicit sounding frames to determine the best sector for BF pattern or other transmission parameter(s). This can use metrics such as link quality, total interference, total received power, or other suitable metrics.

At block 556, the second wireless node determines whether to send a final decision or CSI feedback to the first wireless node. For example, this determination can be based on a flag set during the link setup between the first and second wireless nodes or from the sounding packet itself. In response to determining to send the BF decision at block 556, the second wireless node may generate a BF matrix index or BF matrix at block 558 which may be sent to the first wireless node from the second wireless node. In response to determining to send the feedback at block 556, the second wireless node may generate CSI feedback at block 560, which may be sent to the first wireless node from the second wireless node.

Figure 6:
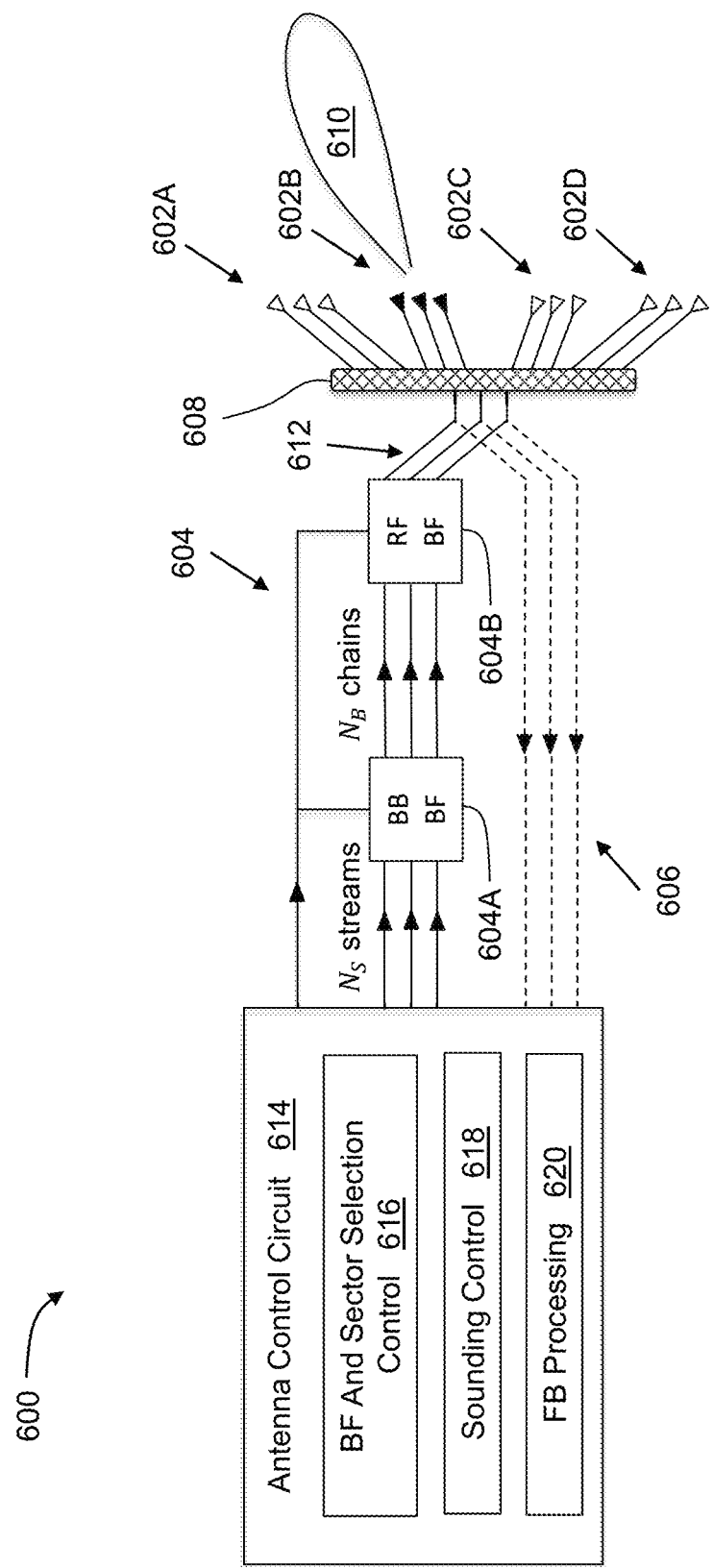
FIG. 6 illustrates an example system for hybrid sector and beamforming selection.

FIG. 6 illustrates an example system 600 for hybrid sector and beamforming selection, arranged in accordance with at least one implementation described herein. The system 600 includes multiple antenna sectors 602A, 602B, 602C, 602D (collectively antenna sectors 602). A number S of the antenna sectors 602 is four in the example of FIG. 6 and may more generally be two or more. Each of the antenna sectors 602 may include multiple antenna elements per antenna sector 602. A number $N_A$ of the antenna elements per antenna sector 602 is three in the example of FIG. 6 and may more generally be two or more.

The antenna sectors 602 share a set of TX chains 604 and RX chains 606 (collectively TX/RX chains 604/606). The TX chains 604 include both BB BF chains 604A and a RF BF chains 604B. Although not illustrated in FIG. 6, the RX chains 606 may similarly include BB BF chains and a RF BF chains.

The TX/RX chains 604, 606 are coupled to the antenna sectors 602 through a switch or switch fabric 608 which selectively communicatively couples the TX chains 604 or RX chains 606 to any one of the antenna sectors 602 at a time. The specific one of the antenna sectors 602 communicatively coupled to the TX chains 604 or the RX chains 606 at a given time may be referred to as the active antenna sector. FIG. 6 illustrates the antenna sector 602B as the active antenna sector having a radiation profile 610. Multiple antenna drivers 612, e.g., one each per TX chain 604, may drive the antenna elements of the active antenna sector.

The system 600 may further include an antenna control circuit 614 that includes a BF and sector selection control module 616, a sounding control module 618, and a feedback processing module 620. In an example implementation with shared BB/RF BF chains 604A, 604B among antenna sectors 602, only one sector may be active at a time. The sounding control module 618 may configure the BB/RF BF chains 604A, 604B (e.g., mainly BB/RF precoders) for the purpose of sounding. In some implementations there are two types of sounding packets: SSPs and/or hybrid BF sounding packet. The sounding control module 618 utilizes historical information to determine current sounding precoders and generates the SSP.

The feedback processing module 620 receives the CSI feedback from a corresponding wireless node and also acquires RSSI of the AGC stage and/or other metric(s). The feedback processing module 620 uses the CSI and RSSI based metrics to perform proper processing and interpolations to calculate at least one of hybrid BF precoder settings and sector mapping for at least one of a next sounding round and data packet transmission. The feedback processing module 620 maintains and updates the historical information and provides the historical information to sounding control module 618 for subsequent sounding. The feedback processing module 620 generates the BF vectors based on the sounding feedback.

The BF and sector selection control module 616 uses the calculations of feedback processing module 620 to configure at least one of BB BF of the BB BF chains 604A, RF BF of the RF BF chains 604B, and antenna sector and antenna states of the active antenna sector for subsequent data transmission.

Figure 7:
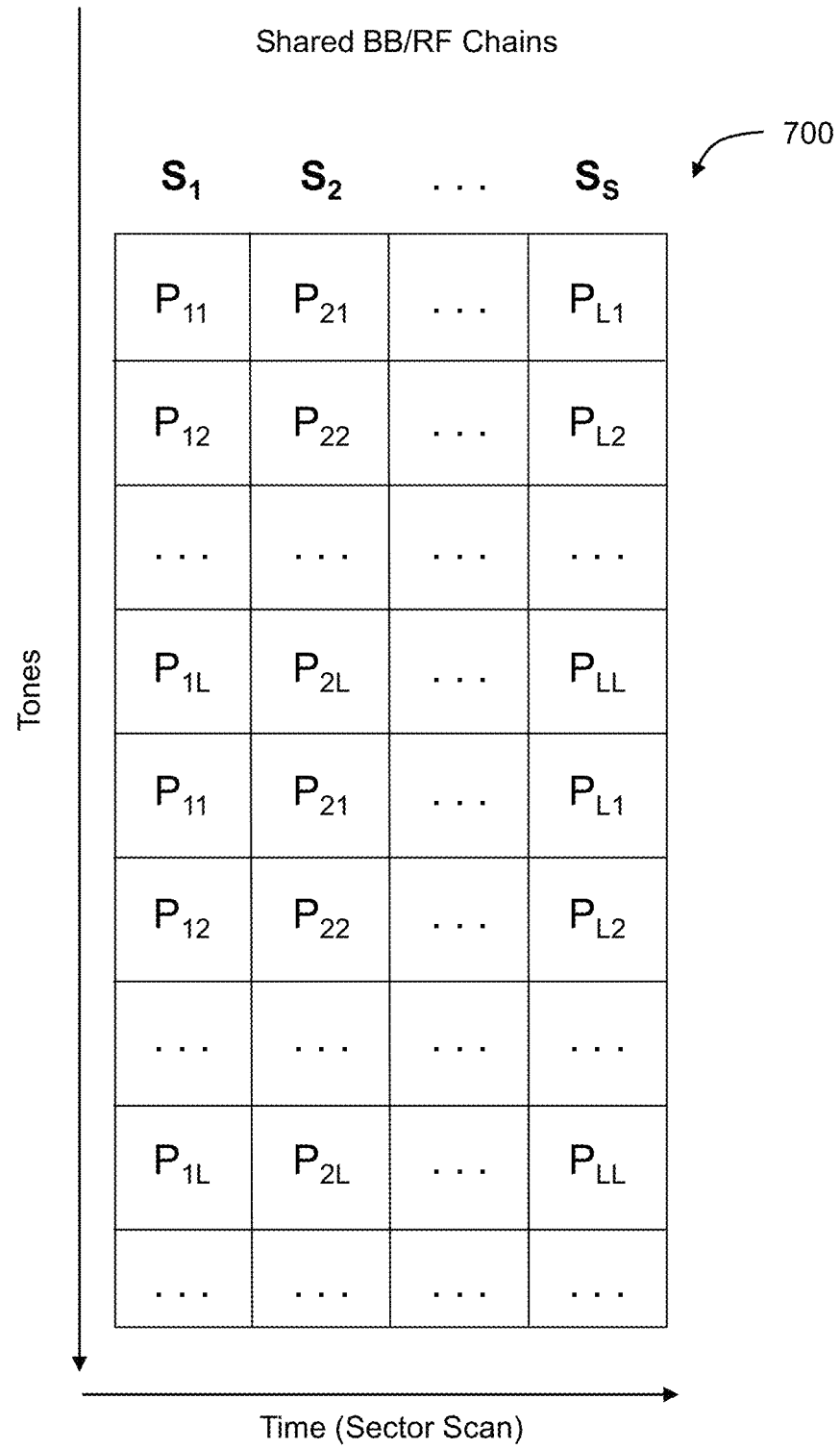
FIG. 7 illustrates an example distribution of precoders in an OFDM time-frequency resource space for hybrid sector and beamforming selection.

FIG. 7 illustrates an example distribution of precoders in an OFDM time-frequency resource space 700 (hereinafter resource space 700) for hybrid sector and beamforming selection, arranged in accordance with at least one implementation described herein. In the example of FIG. 7, each of one or more of antenna sectors $S_1, S_2, \ldots S_S$ of a transmitter wireless node is assigned precoders in a corresponding time slot of the resource space 700 such that one of the antenna sectors is active at a time. The assigned precoders may take into account capabilities of the receive wireless node and/or may be dependent on the receive wireless station and the active antenna sector. Multiple precoders may be used across tones in the resource space 700, such as precoders $P_{11}, P_{12}, \ldots P_{1L}$ for antenna sector $S_1$ in the first time slot and/or precoders $P_{21}, P_{22}, \ldots P_{2L}$ for antenna sector $S_2$ in the second time slot. The precoders for a given antenna sector and time slot may repeat.

Figure 8:
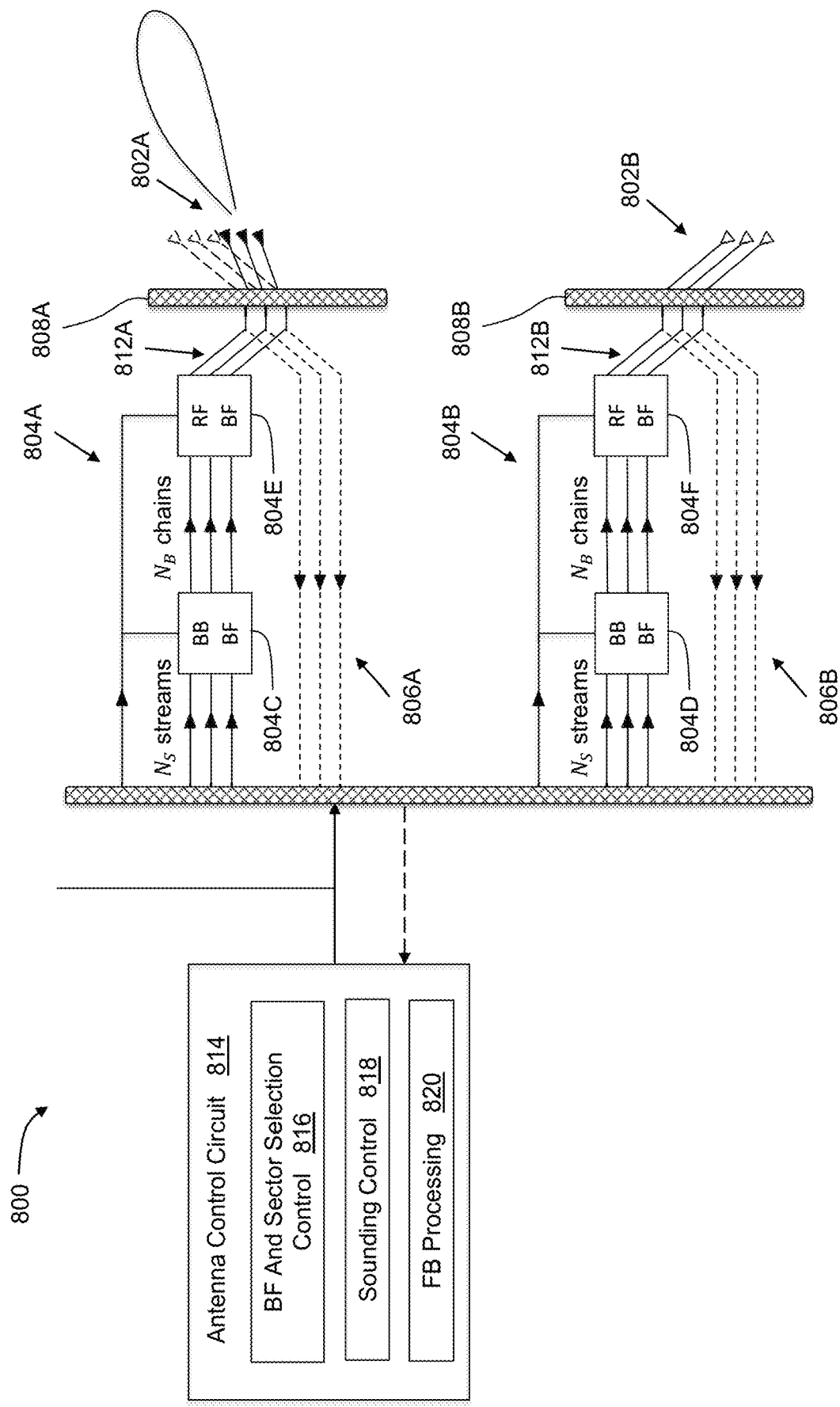
FIG. 8 illustrates another example system for hybrid sector and beamforming selection.

FIG. 8 illustrates another example system 800 for hybrid sector and beamforming selection, arranged in accordance with at least one implementation described herein. The system 800 includes multiple antenna sectors 802A, 802B (collectively antenna sectors 802). A number S of the antenna sectors 802 is two in the example of FIG. 8 and may more generally be two or more. Each of the antenna sectors 802 may include multiple antenna elements per antenna sector 802. A number $N_A$ of the antenna elements per antenna sector 802 is three in the example of FIG. 8 and may more generally be two or more.

Each of the antenna sectors 802 has dedicated TX chains 804A, 804B and RX chains 806A, 806B (collectively TX/RX chains 804/806). The TX chains 804 include both BB BF chains 804C, 804D and RF BF chains 804E, 804F.

Although not illustrated in FIG. 8, the RX chains 806 may similarly include BB BF chains and RF BF chains.

The TX/RX chains 804A, 806A are coupled to the antenna sector 802A through a switch or switch fabric 808A which selectively communicatively couples the TX chains 804A or the RX chains 806A to the antenna sector 802A. Analogously, the TX/RX chains 804B, 806B are coupled to the antenna sector 802B through a switch or switch fabric 808B which selectively communicatively couples the TX chains 804B or the RX chains 806B to the antenna sector 802B. One or more of the sectors 802 of FIG. 8 may be active at a time.

The system 800 may further include an antenna control circuit 814 that includes a BF and sector selection control module 816, a sounding control module 818, and a feedback processing module 820. In an example implementation with dedicated BB/RF BF chains 804C, 804D, 804E, 804F multiple sectors may be active at a time. The sounding control module 818 may configure the BB/RF BF chains 804C, 804D, 804E, 804F (e.g., mainly BB/RF precoders) for the purpose of sounding. The sounding control module 820 utilizes historical information to determine current sounding precoders and generates the SSP.

The feedback processing module 820 receives the CSI feedback from a corresponding wireless node and also acquires RSSI of the AGC stage and/or other metric(s). The feedback processing module 820 uses the CSI and RSSI based metrics to perform proper processing and interpolations to calculate at least one of hybrid BF precoder settings and sector mapping for at least one of a next sounding round and data packet transmission. The feedback processing module 820 maintains and updates the historical information and provides the historical information to sounding control module 818 for subsequent sounding. The feedback processing module 620 generates the BF vectors based on the sounding feedback.

The BF and sector selection control module 816 uses the calculations of feedback processing module 820 to configure at least one of BB BF of the BB BF chains 804C, 804D, RF BF of the RF BF chains 804E, 804F, and antenna sector and antenna states of the active antenna sectors for subsequent data transmission.

Figure 9:
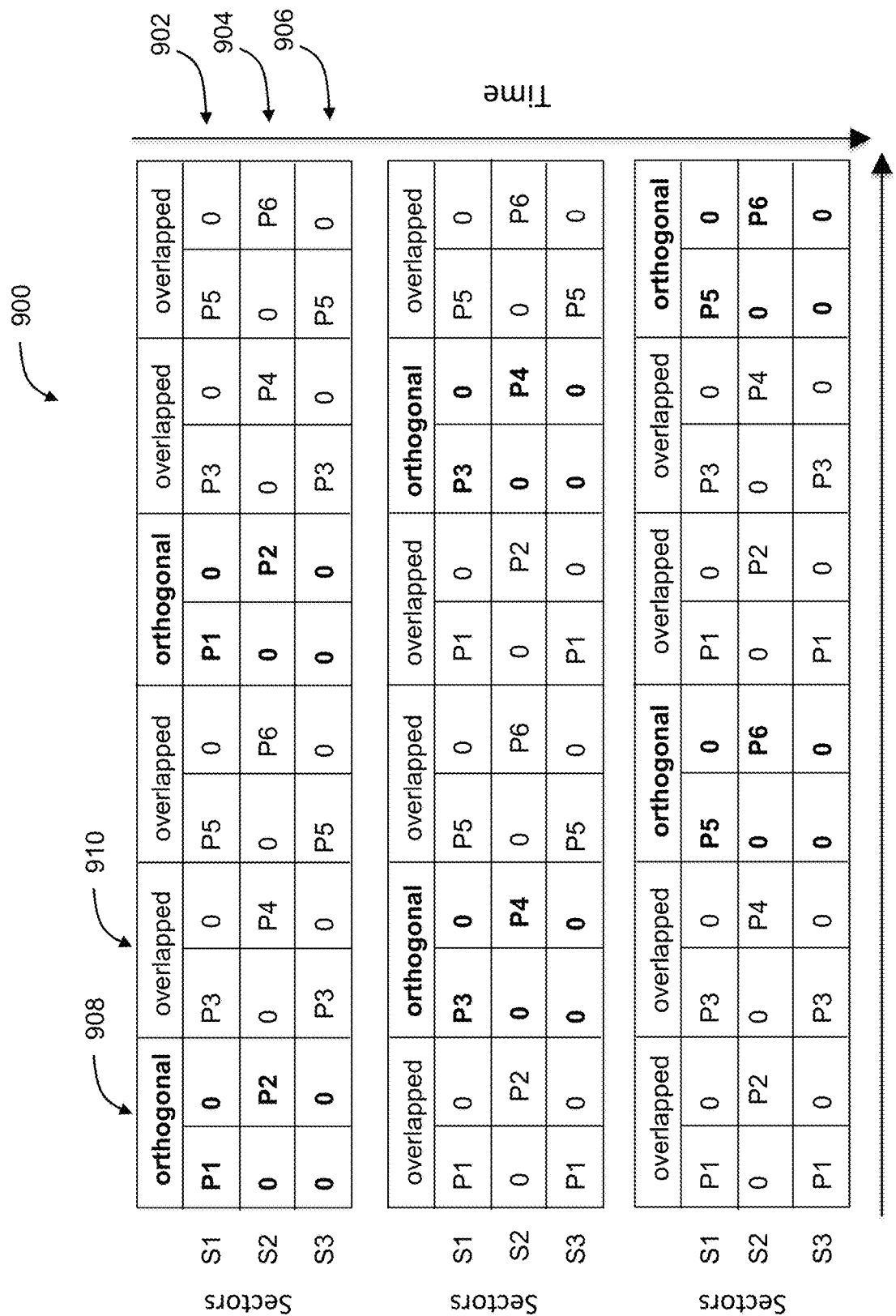
FIG. 9 illustrates another example distribution of precoders in an OFDM time-frequency resource space for hybrid sector and beamforming selection.

FIG. 9 illustrates another example distribution of precoders in an OFDM time-frequency resource space 900 (hereinafter resource space 900) for hybrid sector and beamforming selection, arranged in accordance with at least one implementation described herein. In the example of FIG. 9, each of antenna sectors $S_1, S_2, S_S$ of a transmitter wireless node is assigned various precoders in various active tones of a time slot for the corresponding antenna sector $S_1, S_2, S_3$ within the resource space 900. Active tones of a time slot refer to tones to which a precoder is assigned. Inactive tones of a time slot refer to tones to which a precoder is not assigned.

As an example, in a first time slot 902, precoders P1, P3, and P5 are assigned in an alternating manner to odd tones in the first time slot 902. Thus, the odd tones of the first time slot that have precoders are considered active tones. The precoders of the first time slot 902 are assigned to be transmitted from antenna sector $S_1$ as indicated by the label "$S_1$" to the left of the first time slot 902.

As another example, in a second time slot 904, precoders P2, P4, and P6 are assigned in an alternating manner to even tones in the second time slot 904. Thus, the even tones of the second time slot 904 that have precoders are considered active tones. The precoders of the second time slot 904 are assigned to be transmitted from antenna sector $S_2$ as indicated by the label "$S_2$" to the left of the second time slot 904.

Other antenna sectors of the transmitter wireless node, e.g., sector $S_3$, may or may not have an assigned time slot with one or more precoders. In the example of FIG. 9, a third time slot 906 is assigned to antenna sector $S_3$ with precoders P3, P5 alternating in the third, fifth, ninth, and eleventh tones of the third time slot 906.

A set of resources that includes a sequence of tones in a sequence of time slots assigned across all antenna sectors of the transmitter wireless node may be referred to as a sounding resource set. Sounding resource sets may be orthogonal or overlapped, as labeled in FIG. 9. An orthogonal sounding resource set may include a single precoder per tone.

One orthogonal sounding resource set is designated in FIG. 9 at 908. The orthogonal sounding resource set 908 includes precoder P1 assigned to antenna sector $S_1$ in the first time slot 902 and precoder P2 assigned to antenna sector $S_2$ in the second time slot 904 with no precoders assigned to antenna sector $S_3$.

One overlapped sounding resource set is designated in FIG. 9 at 910. The overlapped sounding resource set 910 includes precoder P3 assigned to antenna sector $S_1$ in the first time slot 902, precoder P4 assigned to antenna sector $S_2$ in the second time slot 904, and precoder P3 assigned to antenna sector $S_3$ in the third time slot 906. Overlapped sounding resources sets may involve sounding the same precoder (e.g., precoder P3 in the overlapped sounding resource set 910) on the same tone for two different antenna sectors where the antenna sectors are orthogonal to each other. In the overlapped sounding resource set 910, for instance, antenna sectors $S_1$ and $S_3$ may be orthogonal.

In some implementations, each orthogonal sounding resource set may be followed by two or more overlapped sounding resource sets before repeating the sequence. The orthogonal sounding resource sets may be used for sector identification. The overlapped sounding resource sets may exploit sectors orthogonality. Consecutive sounding resource sets may be timed to reduce overhead. Precoders may be repeated over time and/or over tones.

Accordingly, FIG. 9 illustrates an implementation in which multiple antenna sectors may be sounded in the same sounding packet by distributing precoders across tones and/or time slots in an OFDM time-frequency resource space, such as the resource space 900.

Figure 10:
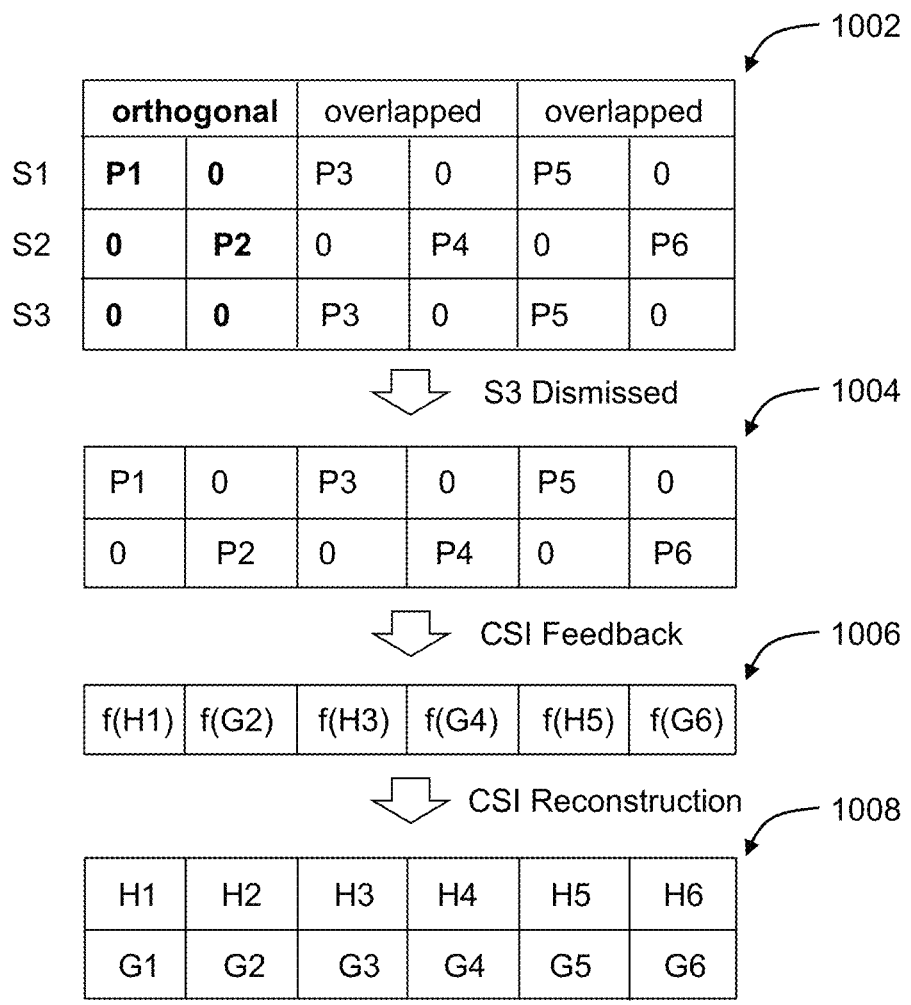
FIG. 10 illustrates example tables for channel reconstruction.

FIG. 10 illustrates example tables 1002, 1004, 1006, 1008 for channel reconstruction, arranged in accordance with at least one implementation described herein. The table 1002 includes a portion of the resource space 900 of FIG. 9 with the assigned precoders and represents a portion of a sounding packet sent from a transmitter wireless node to a receiver wireless node, e.g., the precoders of FIG. 9 sent to the receiver wireless node over the assigned tones and time slots. The table 1002 and the other tables 1004, 1006, 1008 are shown in truncated form for simplicity.

The sounding packet is received at the receiver wireless node, which determines to dismiss the precoders of antenna sector $S_3$, resulting in table 1004 which is similar to the table 1002 except that the precoders of antenna sector $S_3$ have been dismissed. The receiver wireless node may then generate CSI feedback from the received precoders of antenna sectors $S_1$ and $S_2$, illustrated as table 1006 in FIG. 10.

The CSI feedback includes f(H1), f(H3), and f(H5) which may represent, e.g., the channel response of the channel from the antenna sector $S_1$ of the transmitter wireless node to the receiver wireless node for the precoders P1, P3, and P5. The CSI feedback additionally includes f(G2), f(G4), and f(G6) which may represent, e.g., the channel response of the channel from the antenna sector $S_2$ of the transmitter wireless node to the receiver wireless node for the precoders P2, P4, and P6.

In some implementations, the receiver wireless node may then perform CSI reconstruction to reconstruct channels across all subcarriers (or tones) for one or more antenna sectors from feedback associated with only some of the subcarriers. Table 1008 illustrates example CSI reconstruction for the antenna sectors $S_1$ and $S_2$.

The receiver wireless node may determine a particular antenna sector, beamforming matrix, or other transmission parameter(s) based on the CSI feedback, the CSI, and/or a decision measure g(CSI) and may send the determined transmission parameter(s) to the transmitter wireless node. In some implementations, the receiver wireless node may candidate some sectors and provide CSI feedback on them to the transmitter wireless node where the transmitter wireless node performs CSI reconstruction and determines a particular antenna sector, beamforming matrix, or other transmission parameter(s) based on the CSI feedback, the CSI, and/or a decision measure g(CSI).

CSI reconstruction may involve performing smoothing or interpolation from feedback on active tones. For example, the transmitter or receiver wireless node may reconstruct CSI for inactive tones from feedback and/or calculated CSI for active tones. In the example of FIG. 10, for instance, CSI H1, H3, and H5 in table 1008 may be determined from CSI feedback f(H1), f(H3), and f(H5) in table 1006 and then smoothing or interpolation may be performed on CSI H1, H3, and H5 to estimate CSI H2, H4, and H6. As another example, CSI G2, G4, and G6 in table 1008 may be determined from CSI feedback f(G2), f(G4), and f(G6) in table 1006 and then smoothing or interpolation may be performed on CSI G2, G4, and G6 to estimate CSI G1, G3, and G5.

The decision measure g(CSI) may include a performance metric. For example, the decision measure g(CSI) may include at least one of capacity, throughput, an average over tones in the OFDM time-frequency resource space of MIMO channel rank or condition number, average over tones of SNR, and delay spread (frequency domain diversity).

In an example implementation, the decision measure g(CSI) includes throughput. Normally, signal amplitude of the channel between the transmitter and receiver wireless nodes may vary with frequency (e.g., with tones or subcarriers) and antenna sector. The frequency dependence of the signal amplitude of the channel may be determined from the CSI (e.g., table 1008 in FIG. 10). Thus, determining one or more transmission parameters may include determining transmission parameters (such as particular transmission frequencies and/or antenna sectors) that optimize throughput, e.g., determining the transmission frequency(ies) and/or antenna sector(s) that maximize signal amplitude/throughput and applying those transmission frequency(ies) and/or antenna sector(s) for transmission after channel sounding. In another example implementation, the decision measure g(CSI) includes coverage, delay spread, etc.

Figure 11:
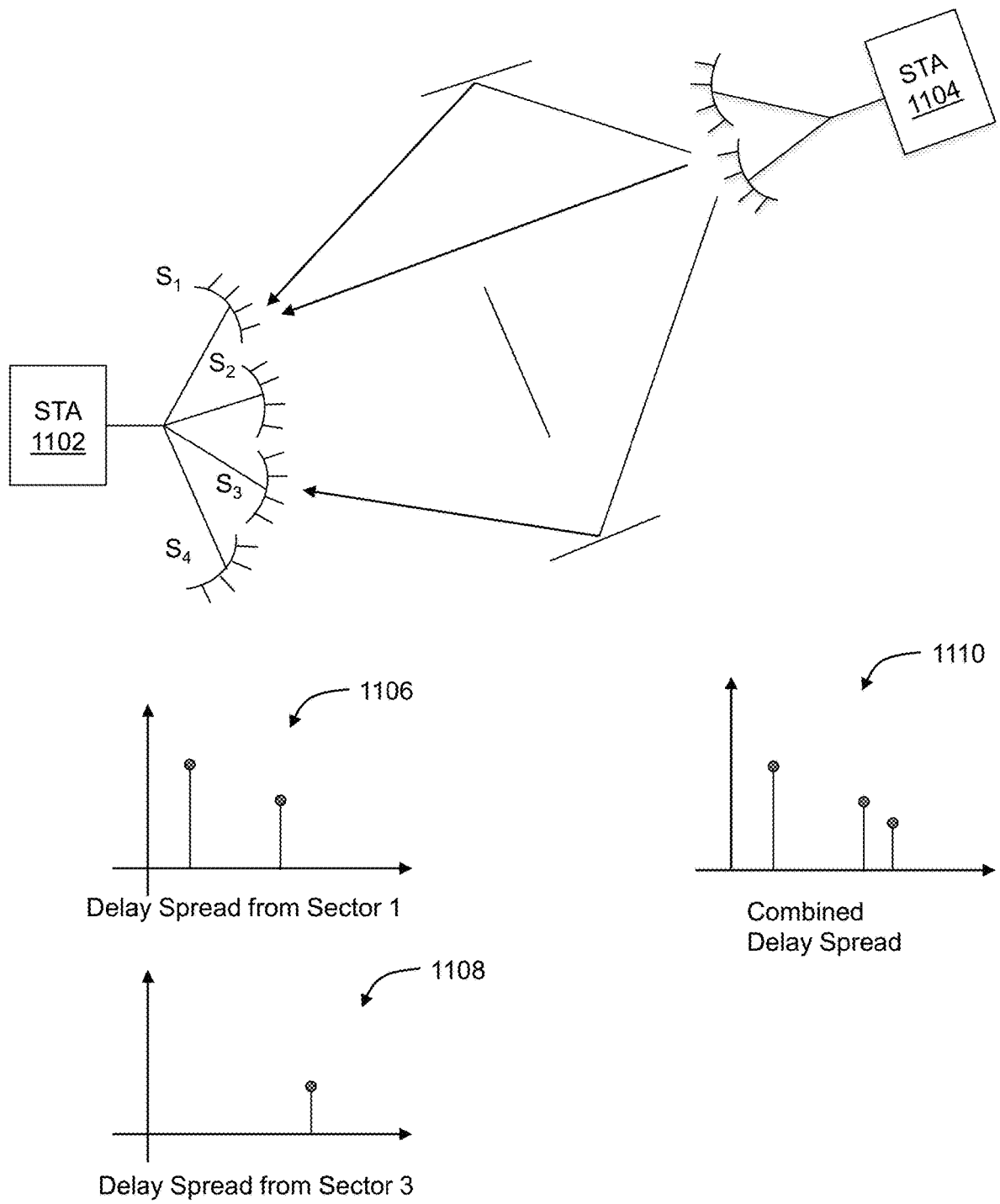
FIG. 11 illustrates an example of determining one or more transmission parameters based on CSI and delay spread.

FIG. 11 illustrates an example of determining one or more transmission parameters based on CSI and delay spread, arranged in accordance with at least one implementation described herein. In example implementations, multiple soundings can be combined to determine the channel estimates to improve metrics (e.g., monitoring a metric for motion detection). Example implementations can scan based on a pre-determined schedule (e.g., round-robin schedule), adaptive schedule (e.g., trigger based, iterative, etc.) to maximize coverage. For example, in a physical environment where an antenna or sector receives suboptimal feedback from portions or directions of the environment, the sampling directionality can maximize sounding in the direction (e.g., eigen modes using the channel estimates) for the missed portions of the environment associated with the suboptimal feedback.

Instead of sampling only the dominant eigen modes of the estimated channel from historical information, an implementation can use an enlarged subset to maximize a coverage metric (e.g., CSI based motion detection, etc.). In an example, when a motion detection application identifies a potential motion event in a given direction or antenna sector, the adaptive schedule can configure the sounding to cover correlated dimensions or neighboring antenna sectors based on the given direction or antenna sector.

FIG. 11 includes wireless nodes 1102, 1104. The wireless node 1102 includes four antenna sectors $S_1$ to $S_4$ and the wireless node 1104 includes two antenna sectors. As illustrated, there may be weaker no reception on antenna sector $S_4$ at the wireless node 1102 and the path to antenna sector $S_2$ may be highly correlated with the path to antenna sector $S_1$. Example delay spread from antenna sector $S_1$ and antenna sector $S_3$ is depicted at, respectively, 1106 and 1108. Combined delay spread from antenna sectors $S_1$ and $S_3$ is depicted at 1110. Antenna sectors $S_1$ and $S_3$ may be selected for transmission as a minimal sector set spanning the combined delay spread for power save and to maximize coverage.

Figure 12A:
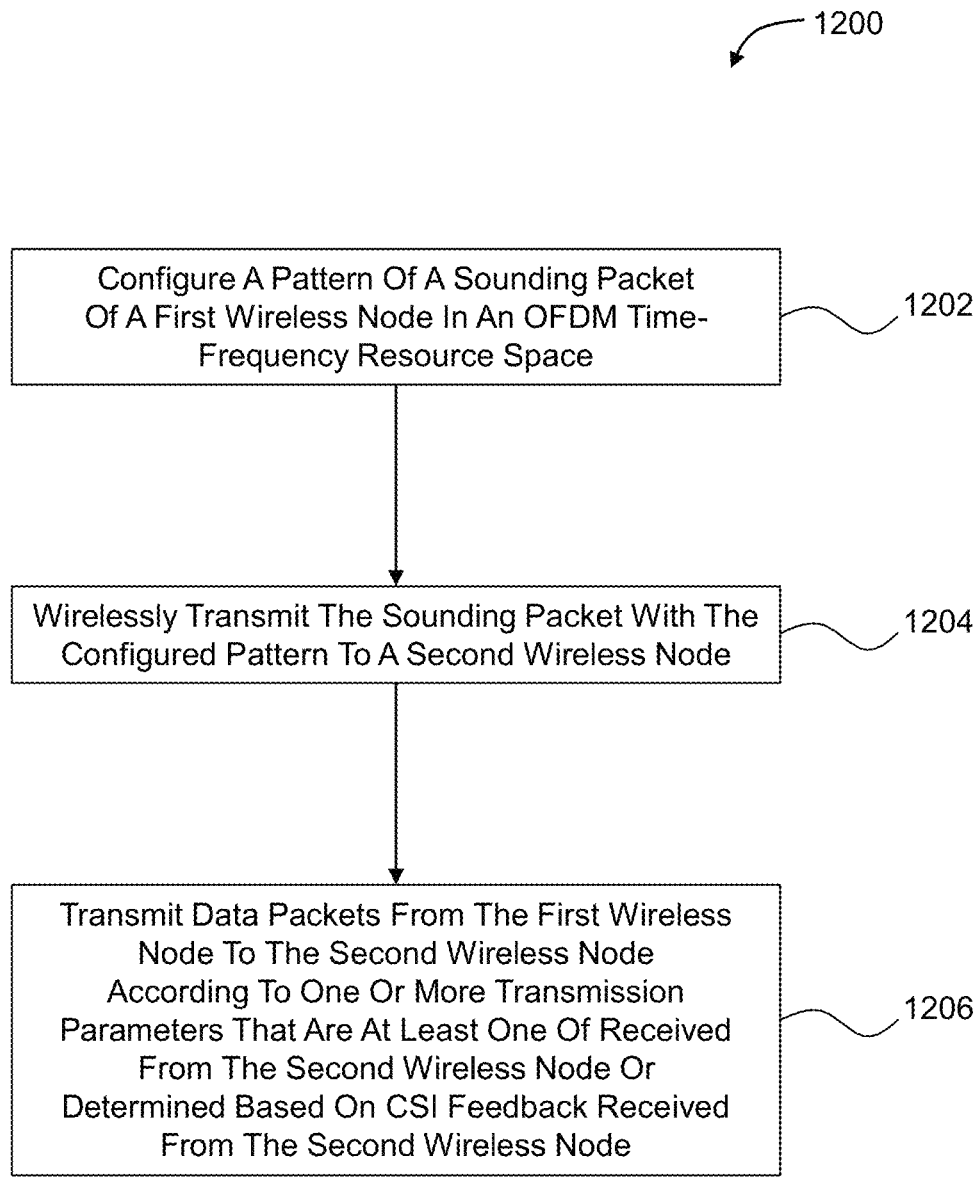
FIG. 12A is a flow diagram of another example method for sounding with hybrid sector and beamforming selection.

FIG. 12A is a flow diagram of another example method 1200 for sounding with hybrid sector and beamforming selection, arranged in accordance with at least one implementation described herein. The method 1200 may be performed by processing logic that may comprise hardware (circuitry, dedicated logic, etc.), software (such as operates on a computer system or a dedicated machine), or a combination of both. An antenna control circuit of, e.g., the AP 202 of FIG. 2, may perform or control performance of the method 1200 of FIG. 12A. Alternatively, other processing logic or hardware may perform or control performance of the method 1200 of FIG. 12A. The method 1200 may include one or more of the blocks of the method 500 of FIG. 5A and/or one or more of the blocks of the method 1200 may be included in the method 500 of FIG. 5A.

At block 1202, a pattern of a sounding packet of a first wireless node in an OFDM time-frequency resource space may be configured. The first wireless node may include multiple antenna sectors, including a first antenna sector and a second antenna sector. The first wireless node may generally include or correspond to the transmit wireless nodes described elsewhere herein. The sounding packet may be configured to sound a channel between the first wireless node and a second wireless node for each of the antenna sectors in fewer channel uses than a number of the antenna sectors. The second wireless node may generally include or correspond to the receive wireless nodes described elsewhere herein.

Configuring the pattern of the sounding packet may include assigning first precoders to a first subset of active tones in the OFDM time-frequency resource space for a first antenna sector of the first wireless node. Alternatively or additionally, configuring the pattern of the sounding packet may include assigning second precoders to a second subset of active tones in the OFDM time-frequency resource space for the second antenna sector of the first wireless node.

At block 1204, the sounding packet with the configured pattern may be wirelessly transmitted to the second wireless node.

At block 1206, data packets may be transmitted from the first wireless node to the second wireless node according to one or more transmission parameters that are at least one of received from the second wireless node or determined based on CSI feedback received from the second wireless node. The one or more transmission parameters may include at least one of transmit antenna state and a beamforming matrix to send data packets from the first wireless node to the second wireless node.

The transmit antenna state may specify at least one of a specific antenna sector of the antenna sectors and a specific polarization of one or more of the antenna sectors. The beamforming matrix may specify at least one of discrete phase adjustments and discrete amplitude adjustments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

In some implementations, the method 1200 may further include receiving the one or more transmission parameters from the second wireless node, the one or more transmission parameters determined by the second wireless node based on CSI derived by the second wireless node from the sounding packet.

In some implementations, the method 1200 may further include receiving the CSI feedback from the second wireless node, reconstructing CSI, and calculating the one or more transmission parameters at the first wireless node based on the reconstructed CSI. In more detail, the CSI feedback may include CSI feedback for the first antenna sector on the first subset of active tones. Reconstructing CSI for the first antenna sector may include reconstructing CSI for the first antenna sector on both the first subset of active tones and a first subset of inactive tones based on the CSI feedback. The first subset of inactive tones may include tones of the OFDM time-frequency resource space that lack precoders for the first antenna sector in the sounding packet. The first subset of inactive tones may be interleaved with the first subset of active tones.

Reconstructing CSI for the first antenna sector on both the first subset of active tones and the first subset of inactive tones may include calculating CSI for the first antenna sector on the first subset of active tones from the CSI feedback. Reconstructing CSI for the first antenna sector on both the first subset of active tones and the first subset of inactive tones may also include performing at least one of a smoothing operation and an interpolation operation on the calculated CSI for the first antenna sector on the first subset of active tones to estimate CSI for the first antenna sector on the first subset of inactive tones.

In some implementations, the method 1200 may further include determining the one or more transmission parameters at the first wireless node based on a performance metric. The performance metric may include at least one of capacity, throughput, an average over tones in the OFDM time-frequency resource space of multiple-input multiple-output (MIMO) channel rank or condition number, average over tones of SNR, delay spread, etc.

In some implementations, configuring the pattern may further include assigning a precoder to each of the tones of a first time slot in the OFDM time-frequency resource space for the first antenna sector and assigning a precoder to each of the tones of a second time slot in the OFDM time-frequency resource space for the second antenna sector such that all tones of at least two antenna sectors of the plurality of antenna sectors are sounded by the sounding packet. In this and other implementations, the beamforming matrix may specify a specific one of the antenna sectors to send data packets from the first wireless node to the second wireless node.

In some implementations, the sounding packet is configured to sound a first subset of the antenna sectors of the first wireless node without sounding a second subset of the antenna sectors of the first wireless node. The first subset of the antenna sectors may include the first and second antenna sectors. The second subset of the antenna sectors may include a third antenna sector. The method 1200 may further include receiving the CSI feedback from the second wireless node, the CSI feedback including CSI feedback for the first antenna sector and the second antenna sector. The method 1200 may further include reconstructing CSI for the first antenna sector, the second antenna sector, and the third antenna sector between the first antenna sector and the second antenna sector. The third antenna sector may be in the second subset of the antenna sectors that are not sounded by the sounding packet. The method 1200 may further include calculating the one or more transmission parameters at the first wireless node based on the reconstructed CSI. Reconstructing CSI for the first antenna sector, the second antenna sector, and the third antenna sector may include calculating CSI for the first antenna sector and the second antenna sector from the CSI feedback. Reconstructing CSI for the first antenna sector, the second antenna sector, and the third antenna sector may further include performing at least one of a smoothing operation and an interpolation operation on the calculated CSI for the first antenna sector and the second antenna sector to estimate CSI for the third antenna sector.

Implementations described herein may alternatively or additionally include a non-transitory computer-readable medium having computer-executable instructions stored thereon that are executable by a processor device to perform or control performance of the method 1200 and/or variations thereof.

Implementations described herein may alternatively or additionally include the first wireless node of the method 1200 for wireless communication with one or more other wireless nodes that include the second wireless node on selected OFDM communication channels of a wireless network. The first wireless node may include the antenna sectors, each of the antenna sectors including multiple antenna elements. The first wireless node may include multiple components coupled to one another to form receive chains and transmit chains. The chains may be dependent or shared and may be coupled to the antenna sectors. The first wireless node may include an antenna control circuit coupled to the components and to the antenna sectors to perform or control performance of the method 1200 and/or variations thereof.

Figure 12B:
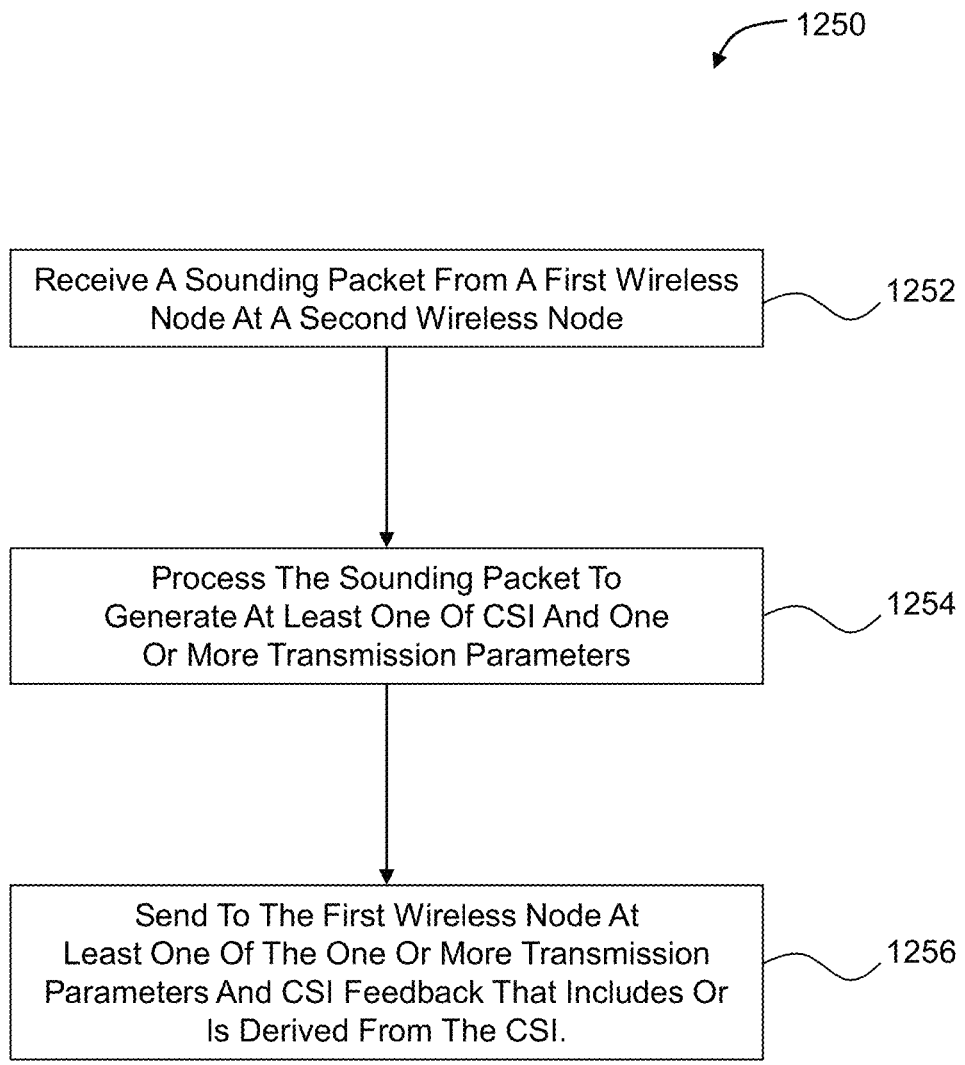
FIG. 12B is a flow diagram of another example method for sounding with hybrid sector and beamforming selection.

FIG. 12B is a flow diagram of another example method 1250 for sounding with hybrid sector and beamforming selection, arranged in accordance with at least one implementation described herein. The method 1250 may be performed by processing logic that may comprise hardware, software, or a combination of both. A processor device of, e.g., one of the STAs 204, 206 of FIG. 2, may perform or control performance of the method 1250 of FIG. 12B. Alternatively, other processing logic or hardware may perform or control performance of the method 1250 of FIG. 12B. The method 1250 may include one or more of the blocks of the method 550 of FIG. 5B and/or one or more of the blocks of the method 1250 may be included in the method 550 of FIG. 5B.

At block 1252, a sounding packet may be received from a first wireless node at a second wireless node. The first wireless node may include multiple antenna sectors, including a first antenna sector and a second antenna sector. The first wireless node may generally include or correspond to the transmit wireless nodes described elsewhere herein. The sounding packet may be configured to sound a channel between the first wireless node and the second wireless node for each of the antenna sectors in fewer channel uses than a number of the antenna sectors. The second wireless node may generally include or correspond to the receive wireless nodes described elsewhere herein.

The sounding packet received at the second wireless node may include first precoders on a first subset of active tones in an OFDM time-frequency resource space. The first precoders on the first subset of active tones may be received at the second wireless node from the first antenna sector of the first wireless node. The sounding packet received at the second wireless node may include second precoders on a second subset of active tones in the OFDM time-frequency resource space. The second precoders on the second subset of active tones may be received at the second wireless node from the second antenna sector of the first wireless node.

At block 1254, the sounding packet may be processed at the second wireless node to generate at least one of CSI and one or more transmission parameters. The one or more transmission parameters may include at least one of transmit antenna state and a beamforming matrix.

At block 1256, at least one of the one or more transmission parameters and CSI feedback that includes or is derived from the CSI may be sent to the first wireless node from the second wireless node.

In some implementations, the method 1250 may further include determining whether to send to the first wireless node the at least one of the one or more transmission parameters and the CSI feedback. The determination may be based on a flag set during link setup between the first wireless node and the second wireless node or a flag set in the sounding packet itself.

In some implementations, processing the sounding packet at block 1254 may include processing the sounding packet at the second wireless node to generate CSI for the first antenna sector of the first wireless node on the first subset of active tones. Processing the sounding packet may include performing at least one of a smoothing operation and an interpolation operation on the CSI for the first antenna sector on the first subset of active tones to estimate CSI for the first antenna sector on a first subset of inactive tones. The subset of inactive tones may include tones of the OFDM time-frequency resource space that lack precoders for the first antenna sector in the sounding packet. The first subset of inactive tones may be interleaved with the first subset of active tones. Processing the sounding packet may include calculating the one or more transmission parameters at the second wireless node based on the CSI for the first antenna sector of the first wireless node on both the first subset of active tones and the first subset of inactive tones.

The method 1250 may include determining the one or more transmission parameters at the second wireless node based on a performance metric. The performance metric may include at least one of capacity, throughput, an average over tones in the OFDM time-frequency resource space of MIMO channel rank or condition number, average over tones of SNR, and delay spread.

In some implementations, precoders are assigned to all the tones of a first time slot in the OFDM time-frequency resource space for the first antenna sector and precoders are assigned to all the tones of a second time slot in the OFDM time-frequency resource space for the second antenna sector such that at least two antenna sectors of the first wireless node are sounded by the sounding packet. The one or more transmission parameters may include a transmit antenna state that specifies a specific antenna sector of the first wireless node to send data packets from the first wireless node to the second wireless node. In this and other implementations, the sounding packet may be configured to sound a first subset of the antenna sectors of the first wireless node without sounding a second subset of the antenna sectors of the first wireless node. The first subset of the antenna sectors may include the first and second antenna sectors. The second subset of the antenna sectors may include a third antenna sector. The method 1250 may further include determining CSI for the first antenna sector and the second antenna sector in the first subset of the antenna sectors. The method 1250 may further include determining CSI for the third antenna sector between the first antenna sector and the second antenna sector. The third antenna sector is in the second subset of the antenna sectors that are not sounded by the sounding packet. The method 1250 may further include calculating the one or more transmission parameters at the second wireless node based on the CSI of the first, second, and third antenna sectors.

In some implementations, determining CSI for the first, second, and third antenna sectors may include determining CSI for the first antenna sector from precoders assigned to all the tones of the first time slot received at the second wireless node. Determining CSI for the first, second, and third antenna sectors may include determining CSI for the second antenna sector from precoders assigned to all the tones of the second time slot received at the second wireless node. Determining CSI for the first, second, and third antenna sectors may include performing at least one of a smoothing operation and an interpolation operation on the determined CSI for the first antenna sector and the second antenna sector to estimate CSI for the third antenna sector.

Implementations described herein may alternatively or additionally include a non-transitory computer-readable medium having computer-executable instructions stored thereon that are executable by a processor device to perform or control performance of the method 1250 and/or variations thereof.

Implementations described herein may alternatively or additionally include the second wireless node of the method 1250 for wireless communication with one or more other wireless nodes that include the first wireless node on selected OFDM communication channels of a wireless network. The second wireless node may include one or more antennas (with one or more antenna sectors). The second wireless node may include multiple components coupled to one another to form receive chains and transmit chains. The chains may be dependent or shared and may be coupled to the one or more antennas. The first wireless node may include an antenna control circuit coupled to the components and to the one or more antennas to perform or control performance of the method 1250 and/or variations thereof.

Figure 12C:
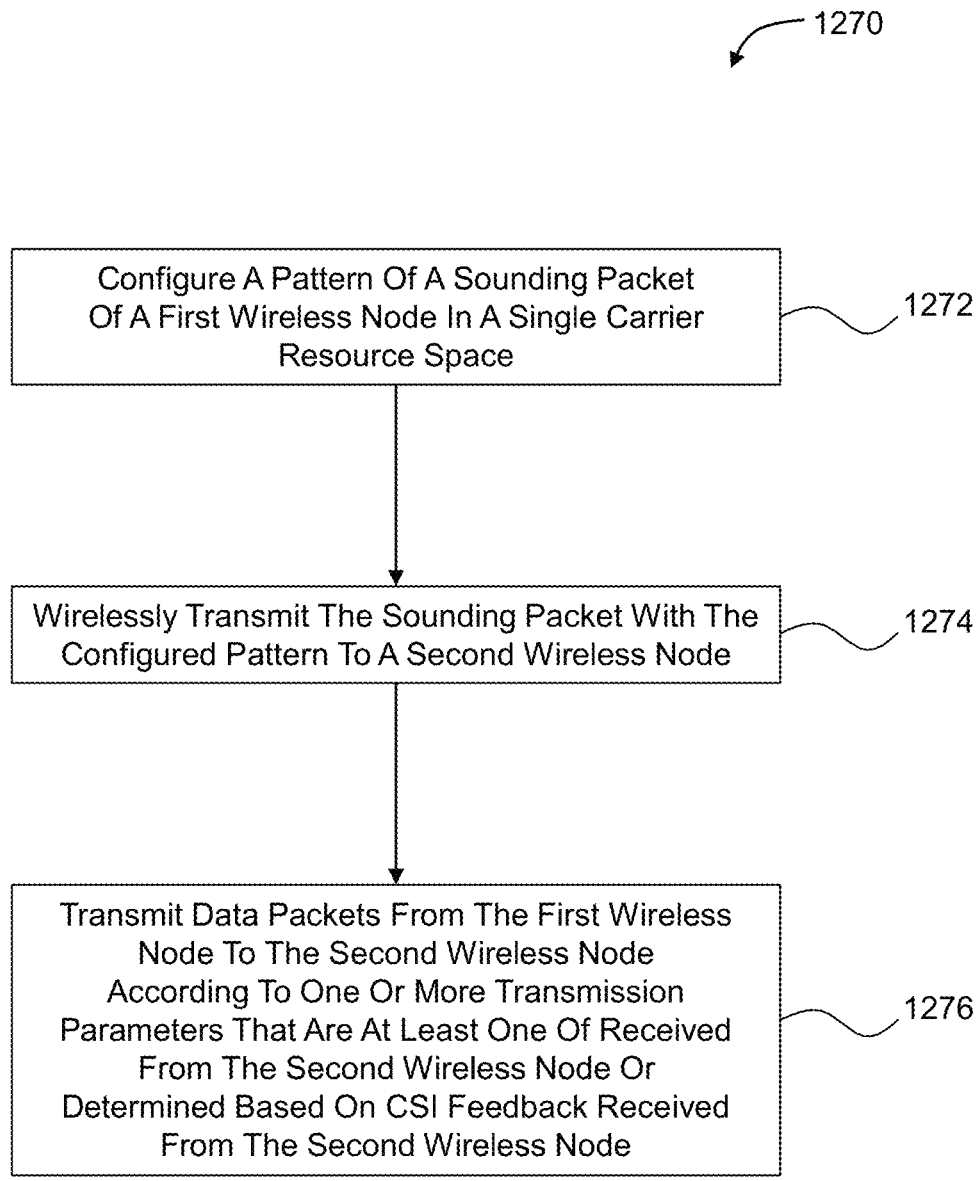
FIG. 12C is a flow diagram of a single carrier example method for sounding with hybrid sector and beamforming selection, all arranged in accordance with at least one implementation described herein.

FIG. 12C is a flow diagram of a single carrier example method 1270 for sounding with hybrid sector and beamforming selection, arranged in accordance with at least one implementation described herein. The sounding can be performed in a single carrier or any other air interface scheme (e.g., time division, frequency hopping, code division, etc.). The method 1270 may be performed by processing logic that may comprise hardware (circuitry, dedicated logic, etc.), software (such as operates on a computer system or a dedicated machine), or a combination of both. An antenna control circuit of, e.g., the AP 202 of FIG. 2, may perform or control performance of the method 1270 of FIG. 12C. Alternatively, other processing logic or hardware may perform or control performance of the method 1270 of FIG. 12C. The method 1270 may include one or more of the blocks of the method 500 of FIG. 5A and/or one or more of the blocks of the method 1270 may be included in the method 500 of FIG. 5A.

The method 1270 may include configuring 1272 a pattern of a sounding packet of a first wireless node in a single carrier resource space. The first wireless node may include multiple antenna sectors, including a first antenna sector and a second antenna sector. The first wireless node may generally include or correspond to the transmit wireless nodes described elsewhere herein. The sounding packet may be configured to sound a channel between the first wireless node and a second wireless node for each of the antenna sectors in fewer channel uses than a number of the antenna sectors. The second wireless node may generally include or correspond to the receive wireless nodes described elsewhere herein.

Configuring the pattern of the sounding packet may include assigning a first plurality of precoders to a first subset of the resource space for a first antenna sector of the first wireless node, the first wireless node having a plurality of antenna sectors that includes the first antenna sector and a second antenna sector. The first subset and second subset of the resource space are based on at least one of a predetermined subset, frequency hopping, time domain, and code domain. Alternatively or additionally, configuring the pattern of the sounding packet may include assigning a second plurality of precoders to a second subset of the resource space for the second antenna sector of the first wireless node.

The method 1270 may include wirelessly transmitting 1274 the sounding packet with the configured pattern to a second wireless node The method 1270 may include transmitting data packets from the first wireless node to the second wireless node according to one or more transmission parameters that are at least one of received from the second wireless node or determined based on channel state information (CSI) feedback received from the second wireless node. The one or more transmission parameters include at least one of transmit antenna state and a beamforming matrix to send data packets from the first wireless node to the second wireless node.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

CSI from any of the communication links described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, and the like.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present invention.

Implementations described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform or control performance of a certain function or group of functions. Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an implementation" or "an implementation" does not imply that such implementation or implementation is essential to the subject technology or that such implementation or implementation applies to all configurations of the subject technology. A disclosure relating to an implementation or implementation may apply to all implementations or implementations, or one or more implementations or implementations. An implementation or implementation may provide one or more examples of the disclosure. A phrase such as "an implementation" or "an implementation" may refer to one or more implementations or implementations and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

The subject technology of the present invention is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses or portions thereof may be combined in any combination, and placed into an independent clause, e.g., Clauses 1, 12, 13, and 22. The other clauses can be presented in a similar manner. The following is a non-limiting summary of some examples presented herein.

Clause 1. A method, comprising:
configuring a pattern of a sounding packet of a first wireless node in a resource space, comprising:
assigning a first plurality of precoders to a first subset of the resource space for a first antenna sector of the first wireless node, the first wireless node having a plurality of antenna sectors that includes the first antenna sector and a second antenna sector; and
assigning a second plurality of precoders to a second subset of the resource space for the second antenna sector of the first wireless node;
wirelessly transmitting the sounding packet with the configured pattern to a second wireless node; and
transmitting data packets from the first wireless node to the second wireless node according to one or more transmission parameters that are at least one of received from the second wireless node or determined based on channel state information (CSI) feedback received from the second wireless node, wherein the one or more transmission parameters include at least one of transmit antenna state and a beamforming matrix to send data packets from the first wireless node to the second wireless node.

Clause 2. The method of clause 1, wherein the resource space is a single carrier resource space; and
the first subset and second subset of the resource space are based on at least one of a predetermined subset, frequency hopping, time domain, and code domain.

Clause 3. The method of clause 1, wherein the resource space is an orthogonal frequency division multiplexing (OFDM) time-frequency resource space; and
the first subset and second subset of the resource space are subsets of active tones in the OFDM time-frequency resource space.

Clause 4. The method of clause 1, wherein at least one of:
the transmit antenna state specifies at least one of a specific antenna sector of the plurality of antenna sectors and a specific polarization of one or more of the plurality of antenna sectors; and
the beamforming matrix specifies at least one of discrete phase adjustments and discrete amplitude adjustments.

Clause 5. The method of clause 1, further comprising receiving the one or more transmission parameters from the second wireless node, the one or more transmission parameters determined by the second wireless node based on CSI derived by the second wireless node from the sounding packet.

Clause 6. The method of clause 3, further comprising:
receiving the CSI feedback from the second wireless node, the CSI feedback including CSI feedback for the first antenna sector on the first subset of active tones;
reconstructing CSI for the first antenna sector on both the first subset of active tones and a first subset of inactive tones based on the CSI feedback, the first subset of inactive tones comprising tones of the OFDM time-frequency resource space that lack precoders for the first antenna sector in the sounding packet, the first subset of inactive tones interleaved with the first subset of active tones; and
calculating the one or more transmission parameters at the first wireless node based on the reconstructed CSI.

Clause 7. The method of clause 6, wherein reconstructing CSI for the first antenna sector on both the first subset of active tones and the first subset of inactive tones comprises:
calculating CSI for the first antenna sector on the first subset of active tones from the CSI feedback; and
performing at least one of a smoothing operation and an interpolation operation on the calculated CSI for the first antenna sector on the first subset of active tones to estimate CSI for the first antenna sector on the first subset of inactive tones.

Clause 8. The method of clause 6, further comprising determining the one or more transmission parameters at the first wireless node based on a performance metric, wherein the performance metric comprises at least one of capacity, throughput, an average over tones in the OFDM time-frequency resource space of multiple-input multiple-output (MIMO) channel rank or condition number, average over tones of signal-to-noise ratio (SNR), and delay spread.

Clause 9. The method of clause 3, wherein:
configuring the pattern further comprises assigning a precoder to each of the tones of a first time slot in the OFDM time-frequency resource space for the first antenna sector and assigning a precoder to each of the tones of a second time slot in the OFDM time-frequency resource space for the second antenna sector such that all tones of at least two antenna sectors of the plurality of antenna sectors are sounded by the sounding packet; and
the beamforming matrix specifies a specific one of the plurality of antenna sectors to send data packets from the first wireless node to the second wireless node.

Clause 10. The method of clause 1, wherein the sounding packet is configured to sound a first subset of the plurality of antenna sectors of the first wireless node without sounding a second subset of the plurality of antenna sectors of the first wireless node, the method further comprising:
receiving the CSI feedback from the second wireless node, the CSI feedback including CSI feedback for the first antenna sector and the second antenna sector, wherein each of the first and second antenna sectors is in the first subset of the plurality of antenna sectors;

reconstructing CSI for the first antenna sector, the second antenna sector, and a third antenna sector between the first antenna sector and the second antenna sector, wherein the third antenna sector is in the second subset of the plurality of antenna sectors that are not sounded by the sounding packet; and calculating the one or more transmission parameters at the first wireless node based on the reconstructed CSI.

Clause 11. The method of clause 10, wherein reconstructing CSI for the first antenna sector, the second antenna sector, and the third antenna sector comprises:

calculating CSI for the first antenna sector from the CSI feedback;

calculating CSI for the second antenna sector from the CSI feedback; and performing at least one of a smoothing operation and an interpolation operation on the calculated CSI for the first antenna sector and the second antenna sector to estimate CSI for the third antenna sector.

Clause 12. A first wireless node for wireless communication with one or more other wireless nodes in a wireless network, the one or more other wireless nodes including a second wireless node, the first wireless node comprising:

a plurality of antenna sectors that include a first antenna sector and a second antenna sector, each of the plurality of antenna sectors including a plurality of antenna elements;

a plurality of components coupled to one another to form receive chains and transmit chains, wherein the chains are dependent or shared and are coupled to the plurality of antenna sectors; and an antenna control circuit coupled to the plurality of components and to the plurality of antenna sectors to perform or control performance of operations comprising:

configuring a pattern of a sounding packet of the first wireless node in a resource space, comprising:

assigning a first plurality of precoders to a first subset of the resource space for the first antenna sector; and assigning a second plurality of precoders to a second subset of the resource space for the second antenna sector;

wirelessly transmitting the sounding packet with the configured pattern to the second wireless node; and transmitting data packets from the first wireless node to the second wireless node according to one or more transmission parameters that are at least one of received from the second wireless node or determined based on channel state information (CSI) feedback received from the second wireless node, wherein the one or more transmission parameters include at least one of transmit antenna state and a beamforming matrix to send data packets from the first wireless node to the second wireless node.

Clause 13. A method, comprising:

receiving a sounding packet from a first wireless node at a second wireless node, the sounding packet comprising:

a first plurality of precoders on a first subset of a resource space, the first plurality of precoders on the first subset of the resource space received at the second wireless node from a first antenna sector of a plurality of antenna sectors of the first wireless node; and a second plurality of precoders on a second subset of the resource space, the second plurality of precoders on the second subset of the resource space received at the second wireless node from a second antenna sector of the plurality of antenna sectors of the first wireless node;

processing the sounding packet to generate at least one of channel state information (CSI) and one or more transmission parameters for the first wireless node, the one or more transmission parameters including at least one of transmit antenna state and a beamforming matrix for the first wireless node; and sending to the first wireless node at least one of the one or more transmission parameters for the first wireless node and CSI feedback that includes or is derived from the CSI.

Clause 14. The method of clause 13, further comprising determining whether to send to the first wireless node the at least one of the one or more transmission parameters for the first wireless node and the CSI feedback based on:

a flag set during link setup between the first wireless node and the second wireless node; or a flag set in the sounding packet itself.

Clause 15. The method of clause 13, wherein the resource space is a single carrier resource space; and the first subset and second subset of the resource space are based on at least one of a predetermined subset, frequency hopping, time domain, and code domain.

Clause 16. The method of clause 13, wherein the resource space is an orthogonal frequency division multiplexing (OFDM) time-frequency resource space; and the first subset and second subset of the resource space are subsets of active tones in the OFDM time-frequency resource space.

Clause 17. The method of clause 16, wherein processing the sounding packet to generate at least one of the CSI and the one or more transmission parameters for the first wireless node comprises:

processing the sounding packet at the second wireless node to generate CSI for the first antenna sector of the first wireless node on the first subset of active tones;

performing at least one of a smoothing operation and an interpolation operation on the CSI for the first antenna sector on the first subset of active tones to estimate CSI for the first antenna sector on a first subset of inactive tones, the subset of inactive tones comprising tones of the OFDM time-frequency resource space that lack precoders for the first antenna sector in the sounding packet, the first subset of inactive tones interleaved with the first subset of active tones; and calculating the one or more transmission parameters for the first wireless node at the second wireless node based on the CSI for the first antenna sector of the first wireless node on both the first subset of active tones and the first subset of inactive tones.

Clause 18. The method of clause 17, further comprising determining the one or more transmission parameters for the first wireless node at the second wireless node based on a performance metric, wherein the performance metric comprises at least one of capacity, throughput, an average over tones in the OFDM time-frequency resource space of multiple-input multiple-output (MIMO) channel rank or condition number, average over tones of signal-to-noise ratio (SNR), and delay spread.

Clause 19. The method of clause 16, wherein:

precoders are assigned to all the tones of a first time slot in the OFDM time-frequency resource space for the first antenna sector and precoders are assigned to all the tones of a second time slot in the OFDM time-frequency resource space for the second antenna sector such that at least two antenna sectors of the plurality of antenna sectors are sounded by the sounding packet; and the one or more transmission parameters for the first wireless node includes a transmit antenna state that specifies a specific antenna sector of the plurality of antenna sectors to send data packets from the first wireless node to the second wireless node.

Clause 20. The method of clause 13, wherein the sounding packet is configured to sound a first subset of the plurality of antenna sectors of the first wireless node without sounding a second subset of the plurality of antenna sectors of the first wireless node, the method further comprising:

determining CSI for the first antenna sector and the second antenna sector in the first subset of the plurality of antenna sectors;

determining CSI for a third antenna sector between the first antenna sector and the second antenna sector, wherein the third antenna sector is in the second subset of the plurality of antenna sectors that are not sounded by the sounding packet; and calculating the one or more transmission parameters for the first wireless node at the second wireless node based on the CSI of the first, second, and third antenna sectors.

Clause 21. The method of clause 20, wherein determining CSI for the first, second, and third antenna sectors comprises:

determining CSI for the first antenna sector from precoders assigned to the first subset of the resource space received at the second wireless node;

determining CSI for the second antenna sector from precoders assigned to the second subset of the resource space received at the second wireless node; and performing at least one of a smoothing operation and an interpolation operation on the determined CSI for the first antenna sector and the second antenna sector to estimate CSI for the third antenna sector.

Clause 22. A wireless node for wireless communication with one or more other wireless nodes in a wireless network, the one or more other wireless nodes including an other wireless node, the wireless node comprising:

one or more antennas;

a plurality of components coupled to one another to form receive chains and transmit chains, wherein the chains are dependent or shared and are coupled to the plurality of antennas of the wireless node; and a processor coupled to the plurality of components and to the one or more antennas of the wireless node to perform or control performance of operations comprising:

receiving a sounding packet from the other wireless node at the wireless node, the sounding packet comprising:

a first plurality of precoders on a first subset of a resource space, the first plurality of precoders on the first subset of the resource space received at the wireless node from a first antenna sector of a plurality of antenna sectors of the other wireless node; and a second plurality of precoders on a second subset of the resource space, the second plurality of precoders on the second subset of the resource space received at the wireless node from a second antenna sector of the plurality of antenna sectors of the other wireless node;

processing the sounding packet to generate at least one of channel state information (CSI) and one or more transmission parameters, the one or more transmission parameters including at least one of transmit antenna state and a beamforming matrix; and sending to the other wireless node at least one of the one or more transmission parameters and CSI feedback that includes or is derived from the CSI.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular implementations described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various implementations of the present disclosure have been described herein for purposes of illustration, and various modifications may be made without departing from the scope and spirit of the present disclosure. Accordingly, the various implementations disclosed herein are not intended to be limiting.

What is claimed is:

1. A method, comprising:
configuring a pattern of a sounding packet of a first wireless node in a resource space, comprising:
assigning a first plurality of precoders to a first subset of the resource space for a first antenna sector of the first wireless node, the first wireless node having a plurality of antenna sectors that includes the first antenna sector and a second antenna sector; and
assigning a second plurality of precoders to a second subset of the resource space for the second antenna sector of the first wireless node;
wirelessly transmitting the sounding packet with the configured pattern to a second wireless node; and
transmitting data packets from the first wireless node to the second wireless node according to one or more transmission parameters that are at least one of received from the second wireless node or determined based on channel state information (CSI) feedback received from the second wireless node, wherein the one or more transmission parameters include at least one of transmit antenna state and a beamforming matrix to send data packets from the first wireless node to the second wireless node.

2. The method of claim 1, wherein the resource space is a single carrier resource space; and
the first subset and second subset of the resource space are based on at least one of a predetermined subset, frequency hopping, time domain, and code domain.

3. The method of claim 1, wherein the resource space is an orthogonal frequency division multiplexing (OFDM) time-frequency resource space; and
the first subset and second subset of the resource space are subsets of active tones in the OFDM time-frequency resource space.

4. The method of claim 1, wherein at least one of:
the transmit antenna state specifies at least one of a specific antenna sector of the plurality of antenna sectors and a specific polarization of one or more of the plurality of antenna sectors; and
the beamforming matrix specifies at least one of discrete phase adjustments and discrete amplitude adjustments.

5. The method of claim 1, further comprising receiving the one or more transmission parameters from the second wireless node, the one or more transmission parameters determined by the second wireless node based on CSI derived by the second wireless node from the sounding packet.

6. The method of claim 3, further comprising:
receiving the CSI feedback from the second wireless node, the CSI feedback including CSI feedback for the first antenna sector on the first subset of active tones;
reconstructing CSI for the first antenna sector on both the first subset of active tones and a first subset of inactive tones based on the CSI feedback, the first subset of inactive tones comprising tones of the OFDM time-frequency resource space that lack precoders for the first antenna sector in the sounding packet, the first subset of inactive tones interleaved with the first subset of active tones; and
calculating the one or more transmission parameters at the first wireless node based on the reconstructed CSI.

7. The method of claim 6, wherein reconstructing CSI for the first antenna sector on both the first subset of active tones and the first subset of inactive tones comprises:
calculating CSI for the first antenna sector on the first subset of active tones from the CSI feedback; and
performing at least one of a smoothing operation and an interpolation operation on the calculated CSI for the first antenna sector on the first subset of active tones to estimate CSI for the first antenna sector on the first subset of inactive tones.

8. The method of claim 6, further comprising determining the one or more transmission parameters at the first wireless node based on a performance metric, wherein the performance metric comprises at least one of capacity, throughput, an average over tones in the OFDM time-frequency resource space of multiple-input multiple-output (MIMO) channel rank or condition number, average over tones of signal-to-noise ratio (SNR), and delay spread.

9. The method of claim 3, wherein:
configuring the pattern further comprises assigning a precoder to each of the tones of a first time slot in the OFDM time-frequency resource space for the first antenna sector and assigning a precoder to each of the tones of a second time slot in the OFDM time-frequency resource space for the second antenna sector such that all tones of at least two antenna sectors of the plurality of antenna sectors are sounded by the sounding packet; and
the beamforming matrix specifies a specific one of the plurality of antenna sectors to send data packets from the first wireless node to the second wireless node.

10. The method of claim 1, wherein the sounding packet is configured to sound a first subset of the plurality of antenna sectors of the first wireless node without sounding a second subset of the plurality of antenna sectors of the first wireless node, the method further comprising:
receiving the CSI feedback from the second wireless node, the CSI feedback including CSI feedback for the first antenna sector and the second antenna sector, wherein each of the first and second antenna sectors is in the first subset of the plurality of antenna sectors;

reconstructing CSI for the first antenna sector, the second antenna sector, and a third antenna sector between the first antenna sector and the second antenna sector, wherein the third antenna sector is in the second subset of the plurality of antenna sectors that are not sounded by the sounding packet; and calculating the one or more transmission parameters at the first wireless node based on the reconstructed CSI.

11. The method of claim 10, wherein reconstructing CSI for the first antenna sector, the second antenna sector, and the third antenna sector comprises:

calculating CSI for the first antenna sector from the CSI feedback;

calculating CSI for the second antenna sector from the CSI feedback; and performing at least one of a smoothing operation and an interpolation operation on the calculated CSI for the first antenna sector and the second antenna sector to estimate CSI for the third antenna sector.

12. A first wireless node for wireless communication with one or more other wireless nodes in a wireless network, the one or more other wireless nodes including a second wireless node, the first wireless node comprising:

a plurality of antenna sectors that include a first antenna sector and a second antenna sector, each of the plurality of antenna sectors including a plurality of antenna elements;

a plurality of components coupled to one another to form receive chains and transmit chains, wherein the chains are dependent or shared and are coupled to the plurality of antenna sectors; and an antenna control circuit coupled to the plurality of components and to the plurality of antenna sectors to perform or control performance of operations comprising:

configuring a pattern of a sounding packet of the first wireless node in a resource space, comprising:
assigning a first plurality of precoders to a first subset of the resource space for the first antenna sector; and
assigning a second plurality of precoders to a second subset of the resource space for the second antenna sector;

wirelessly transmitting the sounding packet with the configured pattern to the second wireless node; and transmitting data packets from the first wireless node to the second wireless node according to one or more transmission parameters that are at least one of received from the second wireless node or determined based on channel state information (CSI) feedback received from the second wireless node, wherein the one or more transmission parameters include at least one of transmit antenna state and a beamforming matrix to send data packets from the first wireless node to the second wireless node.

13. A method, comprising:
receiving a sounding packet from a first wireless node at a second wireless node, the sounding packet comprising:
a first plurality of precoders on a first subset of a resource space, the first plurality of precoders on the first subset of the resource space received at the second wireless node from a first antenna sector of a plurality of antenna sectors of the first wireless node; and
a second plurality of precoders on a second subset of the resource space, the second plurality of precoders on the second subset of the resource space received at the second wireless node from a second antenna sector of the plurality of antenna sectors of the first wireless node;

processing the sounding packet to generate at least one of channel state information (CSI) and one or more transmission parameters for the first wireless node, the one or more transmission parameters including at least one of transmit antenna state and a beamforming matrix for the first wireless node; and sending to the first wireless node at least one of the one or more transmission parameters for the first wireless node and CSI feedback that includes or is derived from the CSI.

14. The method of claim 13, further comprising determining whether to send to the first wireless node the at least one of the one or more transmission parameters for the first wireless node and the CSI feedback based on:

a flag set during link setup between the first wireless node and the second wireless node; or a flag set in the sounding packet itself.

15. The method of claim 13, wherein the resource space is a single carrier resource space; and the first subset and second subset of the resource space are based on at least one of a predetermined subset, frequency hopping, time domain, and code domain.

16. The method of claim 13, wherein the resource space is an orthogonal frequency division multiplexing (OFDM) time-frequency resource space; and the first subset and second subset of the resource space are subsets of active tones in the OFDM time-frequency resource space.

17. The method of claim 16, wherein processing the sounding packet to generate at least one of the CSI and the one or more transmission parameters for the first wireless node comprises:

processing the sounding packet at the second wireless node to generate CSI for the first antenna sector of the first wireless node on the first subset of active tones;

performing at least one of a smoothing operation and an interpolation operation on the CSI for the first antenna sector on the first subset of active tones to estimate CSI for the first antenna sector on a first subset of inactive tones, the subset of inactive tones comprising tones of the OFDM time-frequency resource space that lack precoders for the first antenna sector in the sounding packet, the first subset of inactive tones interleaved with the first subset of active tones; and calculating the one or more transmission parameters for the first wireless node at the second wireless node based on the CSI for the first antenna sector of the first wireless node on both the first subset of active tones and the first subset of inactive tones.

18. The method of claim 17, further comprising determining the one or more transmission parameters for the first wireless node at the second wireless node based on a performance metric, wherein the performance metric comprises at least one of capacity, throughput, an average over tones in the OFDM time-frequency resource space of multiple-input multiple-output (MIMO) channel rank or condition number, average over tones of signal-to-noise ratio (SNR), and delay spread.

19. The method of claim 16, wherein:
precoders are assigned to all the tones of a first time slot in the OFDM time-frequency resource space for the first antenna sector and precoders are assigned to all the tones of a second time slot in the OFDM time-frequency resource space for the second antenna sector such that at least two antenna sectors of the plurality of antenna sectors are sounded by the sounding packet; and the one or more transmission parameters for the first wireless node includes a transmit antenna state that specifies a specific antenna sector of the plurality of antenna sectors to send data packets from the first wireless node to the second wireless node.

20. The method of claim 13, wherein the sounding packet is configured to sound a first subset of the plurality of antenna sectors of the first wireless node without sounding a second subset of the plurality of antenna sectors of the first wireless node, the method further comprising:

determining CSI for the first antenna sector and the second antenna sector in the first subset of the plurality of antenna sectors;

determining CSI for a third antenna sector between the first antenna sector and the second antenna sector, wherein the third antenna sector is in the second subset of the plurality of antenna sectors that are not sounded by the sounding packet; and calculating the one or more transmission parameters for the first wireless node at the second wireless node based on the CSI of the first, second, and third antenna sectors.

21. The method of claim 20, wherein determining CSI for the first, second, and third antenna sectors comprises:

determining CSI for the first antenna sector from precoders assigned to the first subset of the resource space received at the second wireless node;

determining CSI for the second antenna sector from precoders assigned to the second subset of the resource space received at the second wireless node; and performing at least one of a smoothing operation and an interpolation operation on the determined CSI for the first antenna sector and the second antenna sector to estimate CSI for the third antenna sector.

22. A wireless node for wireless communication with one or more other wireless nodes in a wireless network, the one or more other wireless nodes including an other wireless node, the wireless node comprising:

one or more antennas;

a plurality of components coupled to one another to form receive chains and transmit chains, wherein the chains are dependent or shared and are coupled to the plurality of antennas of the wireless node; and a processor coupled to the plurality of components and to the one or more antennas of the wireless node to perform or control performance of operations comprising:

receiving a sounding packet from the other wireless node at the wireless node, the sounding packet comprising:

a first plurality of precoders on a first subset of a resource space, the first plurality of precoders on the first subset of the resource space received at the wireless node from a first antenna sector of a plurality of antenna sectors of the other wireless node; and a second plurality of precoders on a second subset of the resource space, the second plurality of precoders on the second subset of the resource space received at the wireless node from a second antenna sector of the plurality of antenna sectors of the other wireless node;

processing the sounding packet to generate at least one of channel state information (CSI) and one or more transmission parameters, the one or more transmission parameters including at least one of transmit antenna state and a beamforming matrix; and sending to the other wireless node at least one of the one or more transmission parameters and CSI feedback that includes or is derived from the CSI.

* * * * *